United States Patent
Smee et al.

(10) Patent No.: US 7,082,174 B1
(45) Date of Patent: Jul. 25, 2006

(54) METHOD AND APPARATUS FOR PROCESSING A MODULATED SIGNAL USING AN EQUALIZER AND A RAKE RECEIVER

(75) Inventors: John E. Smee, San Diego, CA (US); Ahmad Jalali, San Diego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 487 days.

(21) Appl. No.: 09/624,319

(22) Filed: Jul. 24, 2000

(51) Int. Cl.
*H04B 1/10* (2006.01)

(52) U.S. Cl. .................. 375/349; 375/136; 375/144; 375/147; 370/206; 370/335; 370/342

(58) Field of Classification Search .......... 375/349, 375/130, 133, 136, 140, 141, 144, 147, 148, 375/229, 232, 350, 233; 370/206, 335, 342; 455/132, 67.14
See application file for complete search history.

(56) References Cited

U.S. PATENT DOCUMENTS

| | | | |
|---|---|---|---|
| 4,901,307 A | 2/1990 | Gilhousen et al. | 370/320 |
| 5,103,459 A | 4/1992 | Gilhousen et al. | 370/206 |
| 5,283,531 A * | 2/1994 | Serizawa et al. | 329/316 |
| 5,490,165 A | 2/1996 | Blakeney, II et al. | 370/335 |
| 5,764,687 A | 6/1998 | Easton | 375/147 |

(Continued)

FOREIGN PATENT DOCUMENTS

EP 0961416 A1 1/1999

(Continued)

OTHER PUBLICATIONS

U.S. Appl. No. 08/963,386, entitled "Method and Apparatus for High Rate Packet Data Transmission," filed Nov. 3, 1997, now pending. Paul E. Bender, Qualcomm Inc., San Diego, CA (USA).

(Continued)

*Primary Examiner*—Shuwang Liu
(74) *Attorney, Agent, or Firm*—Philip Wadsworth; Sandra L. Godsey; Thomas R. Rouse

(57) ABSTRACT

In a method for achieving higher S/N, one or more signals are received and processed to provide one or more streams of samples. In a first processing scheme, the sample stream(s) are equalized and combined within an equalizer to generate symbol estimates, which may be subsequently processed (e.g., despread and decovered) to provide a first stream of recovered symbols. The sample stream(s) may be equalized prior to being combined. In this case, each sample stream is filtered with a set of coefficients and may be scaled with a scaling factor. The scaled samples for all streams are then combined to generate the symbol estimates. Alternatively, the sample stream(s) may be combined prior to being equalized. In this case, each sample stream is scaled by a scaling factor. The scaled samples for all streams are then combined to generate summed samples that are further filtered with a set of coefficients to generate the symbol estimates. The sample stream(s) may also be processed by a second processing scheme with one or more rake receivers to provide a second stream of recovered symbols. The signal quality for each processing scheme can be estimated and used to select either the first or second processing scheme.

31 Claims, 8 Drawing Sheets

U.S. PATENT DOCUMENTS

| | | | | |
|---|---|---|---|---|
| 5,799,005 | A | | 8/1998 | Soliman ........................ 370/335 |
| 5,812,601 | A | * | 9/1998 | Schramm ..................... 375/262 |
| 5,903,554 | A | | 5/1999 | Saints .......................... 370/342 |
| 5,930,296 | A | * | 7/1999 | Kot .............................. 375/233 |
| 6,078,573 | A | * | 6/2000 | Batalama et al. ............ 370/335 |
| 6,175,588 | B1 | * | 1/2001 | Visotsky et al. ............. 375/148 |
| 6,314,147 | B1 | * | 11/2001 | Liang et al. ................. 375/346 |
| 6,522,683 | B1 | * | 2/2003 | Smee et al. .................. 375/144 |

FOREIGN PATENT DOCUMENTS

| | | |
|---|---|---|
| GB | 2346765 A | 8/2000 |

OTHER PUBLICATIONS

Javier Ramos et al. "Low-Complexity Space-Time Processor for DS-CDMA Communications," IEEE Transactions on Signal Processing, vol. 48, No. 1, Jan. 2000 (pp. 39-52).

Abdelgader M. Legnain et al. "New Adaptive Combined Space-Time Receiver for Multiuser Interference Rejection in Synchronous CDMA Systems," Electrical and Computer Engineering, 1998 (pp. 421-424).

* cited by examiner

METHOD AND APPARATUS FOR PROCESSING A MODULATED SIGNAL USING AN EQUALIZER AND A RAKE RECEIVER

BACKGROUND OF THE INVENTION

I. Field of the Invention

The present invention relates to data communication. More particularly, the present invention relates to a novel and improved method and apparatus for processing a received modulated signal using an equalizer and a rake receiver for improved performance.

II. Description of the Related Art

A modern day communication system is required to support a variety of applications. One such communication system is a code division multiple access (CDMA) system that supports voice and data communication between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM." Another specific CDMA system is disclosed in U.S. patent application Ser. No. 08/963,386, entitled "METHOD AND APPARATUS FOR HIGH RATE PACKET DATA TRANSMISSION," filed Nov. 3, 1997, now U.S. Pat. No. 6,574,211, issued Jun. 3, 2003, (hereinafter, the HDR system). These patents are assigned to the assignee of the present invention and incorporated herein by reference.

A CDMA system is typically designed to conform to one or more standards. Such standards include the "TIA/EIA/IS-95 Remote Station-Base Station Compatibility Standard for Dual-Mode Wideband Spread Spectrum Cellular System" (the IS-95 standard), the standard offered by a consortium named "$3^{rd}$ Generation Partnership Project" (3GPP) and embodied in a set of documents including Document Nos. 3G TS 25.211, 3G TS 25.212, 3G TS 25.213, and 3G TS 25.214 (the W-CDMA standard), and the "TR-45.5 Physical Layer Standard for cdma2000 Spread Spectrum Systems" (the CDMA-2000 standard). New CDMA standards are continually proposed and adopted for use. These CDMA standards are incorporated herein by reference.

A CDMA system typically employs a rake receiver to process a modulated signal that has been transmitted on the forward or reverse link. The rake receiver typically includes a searcher element and a number of finger processors. The searcher element searches for strong instances of the received signal (or multipaths). The finger processors are assigned to process the strongest multipaths to generate demodulated symbols for those multipaths. The rake receiver then combines the demodulated symbols from all assigned finger processors to generate recovered symbols that are estimates of the transmitted data. The rake receiver efficiently combines energy received via multiple signal paths.

The rake receiver provides an acceptable level of performance for CDMA systems operated at low signal-to-noise ratio (S/N). For CDMA systems designed to transmit data at high data rates, such as the HDR system, higher S/N is required. To achieve the higher S/N, the components that make up the noise term N need to be reduced. The noise term includes thermal noise (No), interference (Io) due to transmissions by other transmitting sources and transmissions for other users, and inter-symbol interference (ISI) that can come from multipath and distortion in the transmission channel. For CDMA systems designed to operate at low S/N, the ISI component is typically negligible compared to other noise components. However, for CDMA systems designed to operate at higher S/N, the other noise components (e.g., interference from other transmission sources) are typically Freduced, and ISI becomes a non-negligible noise component that may have a large impact on the overall S/N.

As noted above, the rake receiver provides acceptable performance when the S/N of the received signal is low. The rake receiver can be used to combine energy from various multipaths, but generally does not remove the effects of ISI (e.g., from multipath and channel distortion). Thus, the rake receiver may not be capable of achieving the higher S/N required by CDMA systems operating at higher data rates.

As can be seen, techniques that can be used to process a received modulated signal to achieve higher S/N needed to support higher data rates are highly desirable.

SUMMARY OF THE INVENTION

The present invention provides techniques that can achieve the higher S/N needed to support higher data rates. In accordance with the invention, a number of signal processing paths can be provided to process one or more signals (e.g., received via one or more antennas). One signal processing path includes an equalizer that attempts to reduce the ISI due to multipath and channel distortion. Another signal processing path can be implemented with one or more conventional rake receivers. Although the signal processing path that includes the equalizer typically provides better performance under certain operating conditions, the signal processing path having a better signal quality estimate can be selected to process the received signal(s).

An embodiment of the invention provides a method for processing one or more signals in a (spread spectrum) communication system. In accordance with the method, one or more signals are received (e.g., via one or more antennas) and processed to provide one or more streams of samples, which are then further processed by a first processing scheme to provide a first stream of recovered symbols. In the first processing scheme, the stream(s) of samples are equalized and combined within an equalizer to generate symbol estimates, which may subsequently be further processed (e.g., despread and decovered) to provide the first stream of recovered symbols. The stream(s) of samples may also be processed by a second processing scheme with one or more rake receivers to provide a second stream of recovered symbols. A signal quality associated with each processing scheme can be estimated and used to select either the first or second processing scheme.

In the first processing scheme, the sample stream(s) may be equalized prior to being combined. In this case, each stream of samples is filtered by a respective filter with a set of coefficients and may be scaled by a respective scaling factor. The scaled samples for all streams are then combined to generate the symbol estimates. Alternatively, the sample stream(s) may be combined prior to being equalized. In this case, each stream of samples can be scaled by a respective (complex) scaling factor. The scaled samples for all streams are then combined to generate summed samples that are further filtered with a set of coefficients to generate the symbol estimates.

Each filter within the equalizer can be implemented as a finite impulse response (FIR) filter, an infinite impulse response (IIR) filter, or some other filter structure. The filter coefficients and scaling factor(s) are typically adapted (i.e., trained) prior to being used, and may further be adapted during use (e.g., using a decision directed adaptation scheme).

Depending on the particular design of the equalizer, various adaptation schemes can be used. In one adaptation scheme, the filter coefficients are adapted separately and sequentially with respect to the scaling factor(s). In this adaptation scheme, the coefficient adaptation can be performed with the scaling factor(s) fixed, and the scaling factor adaptation can be performed with the coefficients fixed. The coefficient adaptation and scaling factor adaptation can be performed iteratively a number of times (e.g., over a particular sequence of expected symbols of known values). For the coefficient adaptation, the coefficients of each filter can be adapted based on (1) the filtered samples from the filter and the expected symbols or (2) the symbol estimates and the expected symbols. Similarly, the scaling factors can be adapted based on the symbol estimates and the expected symbols. Alternatively, in another adaptation scheme, the coefficients for all filters are adapted simultaneously based on the symbol estimates and the expected symbols.

For the above adaptation schemes, the adaptation can be performed using, for example, time division multiplexed (TDM) pilot reference, and in accordance with a least mean square (LMS) algorithm, a recursive least square (RLS) algorithm, a direct matrix inversion (DMI) algorithm, or some other adaptation algorithm. Prior to the adaptation, the coefficients of each filter can be initialized to a particular set of values (e.g., 0, . . . , 0, $\alpha^*$, 0, . . . , 0) and the scaling factor(s) can also be initialized. A large multipath for each signal being received and processed can be identified and the magnitude and phase of the multipath ($\alpha$) can be used to initialize the coefficients and scaling factor associated with the signal. A large multipath for one of the signal(s) being received and processed can also be identified and a time offset corresponding to this multipath can be used for the coefficient and scaling factor adaptation (e.g., the time offset can be used to properly generate the expected values).

The signal quality associated with the first processing scheme can be estimated based on a mean square error (MSE) between the symbol estimates and the expected symbols. The coefficient and scaling factor adaptation can be implemented to minimize this MSE. The MSE can be translated to a signal-to-noise ratio (S/N). The MSE or S/N can then be used to select the data rate for the received signal(s).

Another embodiment of the invention provides a receiver unit operative to process one or more signals in a spread spectrum communication system. The receiver unit includes one or more pre-processors and a first signal processing path that comprises an equalizer and a post processor. Each pre-processor receives and processes a respective signal to provide a corresponding stream of samples. The equalizer receives, combines, and equalizes one or more streams of samples to generate symbol estimates. The post processor receives and may further process (e.g., despread and decover) the symbol estimates to provide a first stream of recovered symbols. The receiver unit may further include a second signal processing path and a controller. The second signal processing path can comprise one or more rake receivers used to process the sample stream(s) to generate a second stream of recovered symbols. The controller receives estimates of signal quality associated with the first and second signal processing paths and selects the first or second signal processing path based on the received signal quality estimates.

The post processor can include a PN despreader and a decover element. The PN despreader receives and despreads the symbol estimates with a PN sequence at a particular time offset to provide despread samples. The decover element decovers the despread samples with one or more channelization (e.g., Walsh) codes to provide the first stream of recovered symbols.

In one design, the equalizer includes one or more filters, one or more multipliers, and a summer. Each filter receives and filters a respective stream of samples with a set of coefficients to provide corresponding filtered samples. Each multiplier receives and scales the filtered samples from a respective filter with a respective scaling factor to provide scaled samples. The summer receives and sums the scaled samples from all multipliers to provide the symbol estimates.

In another design, the equalizer includes one or more multipliers, a summer, and a filter. Each multiplier receives and scales a respective stream of samples with a respective scaling factor to provide scaled samples. The summer receives and sums the scaled samples from all multipliers to provide summed samples. The filter receives and filters the summed samples with a set of coefficients to provide the symbol estimates.

In the above designs, the equalizer further includes a coefficient adjustment element that adapts the coefficients of each filter and the scaling factor(s) for the multiplier(s). Various adaptation schemes can be used, as described above. Depending on the selected adaptation scheme, the filter coefficients can be adapted based on either the filtered samples received from the filter or the symbol estimates. Also, the adaptation can be performed using the pilot reference and in accordance with the LMS, RLS, DMI, or some other algorithm.

The receiver unit can be used at a base station or a remote terminal in a spread spectrum (e.g., CDMA) communication system.

The invention further provides other methods and receiver units that implement various aspects and features of the invention, as described below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
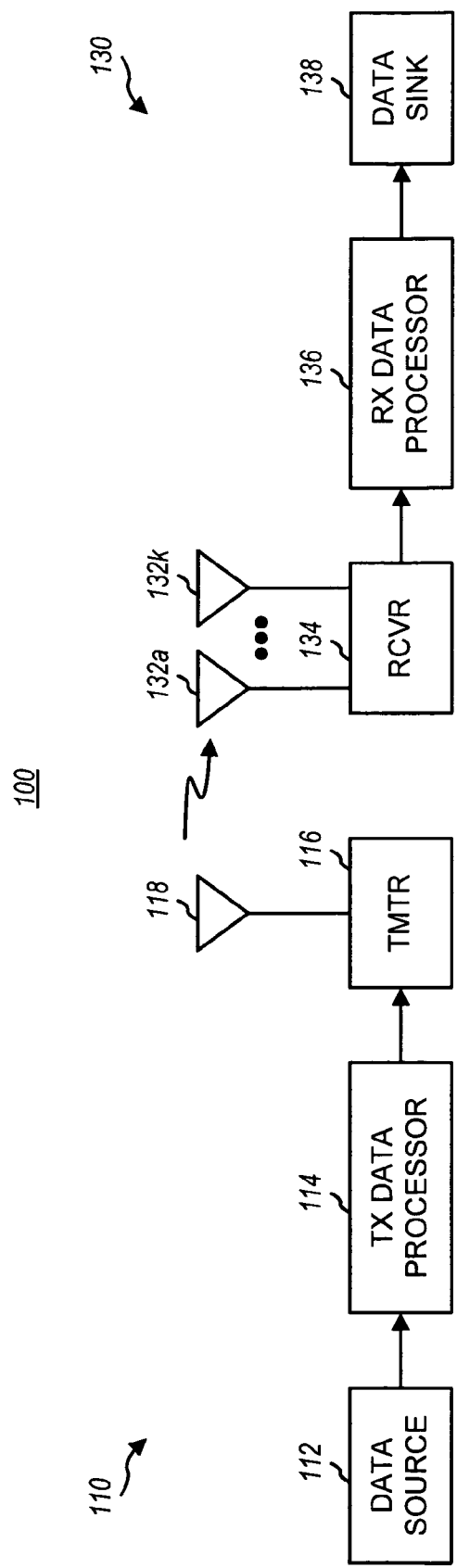
FIG. 1 is a simplified block diagram of an embodiment of the signal processing for a data transmission in a communication system.

FIG. 1 is a simplified block diagram of an embodiment of the signal processing for a data transmission in a communication system 100. At a transmitter unit 110, data is sent, typically in packets, from a data source 112 to a transmit (TX) data processor 114 that formats, encodes, and processes the data to generate one or more analog signals. The analog signals are then provided to a transmitter (TMTR) 116 that amplifies, filters, quadrature modulates, and upconverts the received analog signals to generate a modulated signal suitable for transmission via one or more antennas 118 (only one is shown in FIG. 1) to one or more receiver units.

At a receiver unit 130, the transmitted signal is received by one or more antennas 132a–132k and provided to a receiver (RCVR) 134. Within receiver 134, each received signal is amplified, filtered, frequency downconverted, quadrature demodulated, and digitized to provide inphase (I) and quadrature (Q) samples. The samples may be digitally processed and then provided to a receive (RX) data processor 136 that further processes and decodes the samples to recover the transmitted data. The processing and decoding at receive data processor 136 are performed in a manner complementary to the processing and encoding performed at transmit data processor 114. The decoded data is then provided to a data sink 138.

The signal processing described above supports transmissions of traffic data, messaging, voice, video, and other types of communication in one direction. A bi-directional communication system supports two-way data transmission. The processing in FIG. 1 can represent the forward link processing in a CDMA system, in which case, transmitter unit 110 can represent a base station and receiver unit 130 can represent a remote terminal. The signal processing for the reverse link is not shown in FIG. 1 for simplicity.

Figure 2A:
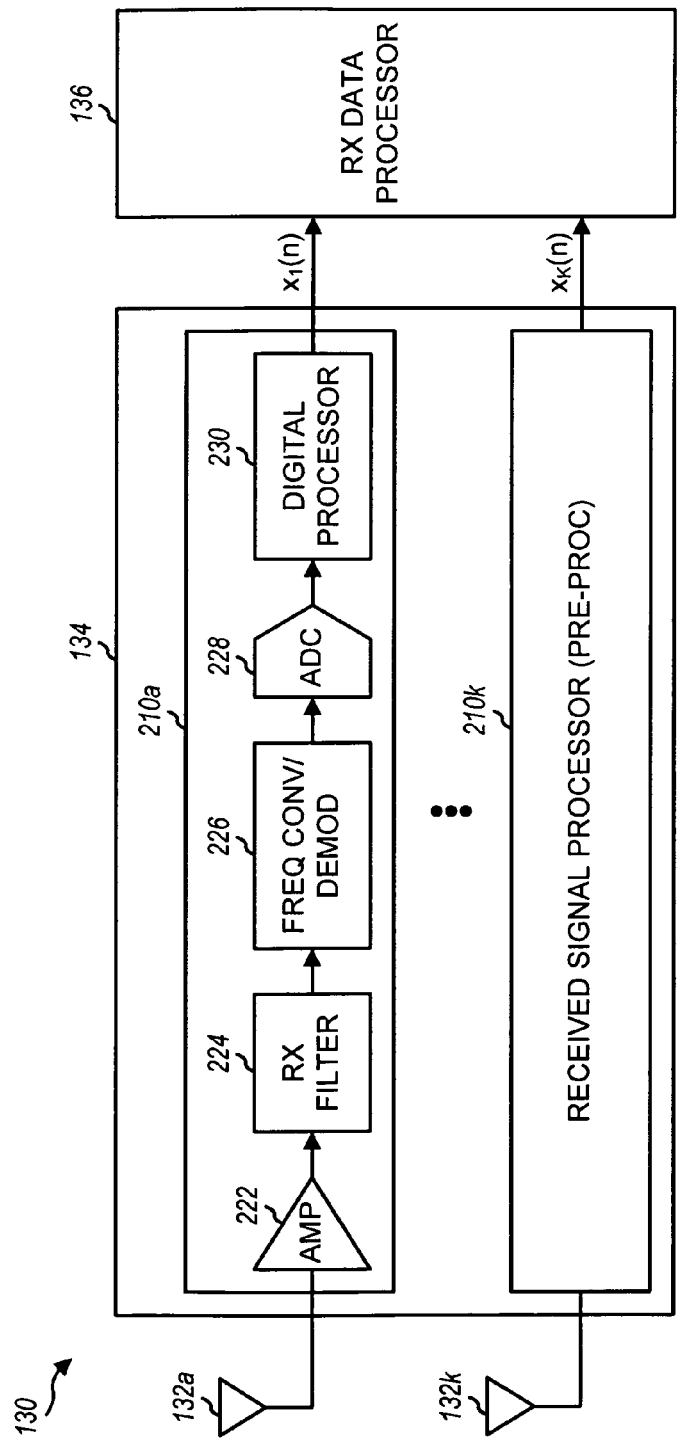
FIG. 2A is a block diagram of an embodiment of a receiver within the communication system.

FIG. 2A is a block diagram of an embodiment of receiver 134. In this embodiment, receiver unit 130 includes a number of antennas 132a through 132k. Each antenna 132 couples to a respective received signal processor (or pre-processor) 210 within receiver 134. Within each pre-processor 210, the received signal from antenna 132 is (low noise) amplified by an amplifier 222, filtered by a receive (RX) filter 224, frequency downconverted and quadrature demodulated by a frequency converter/demodulator 226, and digitized by one or more analog-to-digital converters (ADCs) 228 to provide ADC samples. The ADC samples are further processed by a digital processor 230 to generate complex $I_{IN}$ and $Q_{IN}$ samples that are then provided to receive data processor 136. Digital processor 230 is described in further detail below.

As shown in FIG. 2A, receiver unit 130 includes a number of antennas 132a through 132k that couple to a number of pre-processors 210a through 210k used to process the signals received via the antennas. Each combination of antenna 132 and pre-processor 210 forms part of a signal path used to process a particular received signal. The use of multiple antennas 132 in receiver unit 130 provides spatial diversity and may further suppress interference from other transmission sources, both of which can improve performance. However, receiver unit 130 can also be designed with a single signal path and this is within the scope of the invention.

FIG. 2A shows some of the functional elements that can be used to implement pre-processor 210. Generally, pre-processor 210 can include any combination of the functional elements shown in FIG. 2A, and the elements can also be arranged in any order to obtain the desired output. For example, multiple stages of amplifiers and filters are typically provided within pre-processor 210. Moreover, different functional elements than those shown in FIG. 2A may also be included within pre-processor 210, and this is also within the scope of the invention.

Figure 2B:
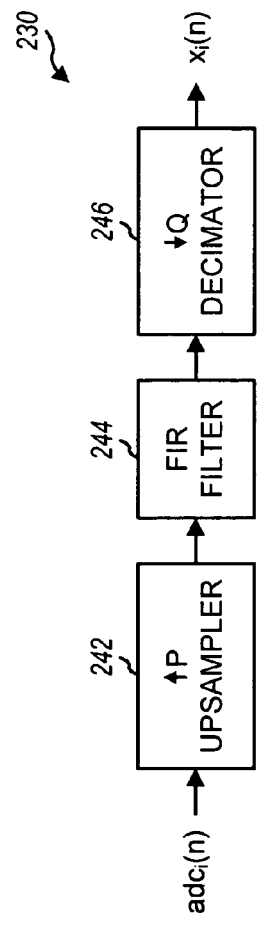
FIG. 2B is a block diagram of an embodiment of a digital processor within the receiver.

FIG. 2B is a block diagram of an embodiment of digital processor 230. Depending on the particular design of receiver unit 130, the received signal may be sampled by ADCs 228 at a particular sampling rate, $f_{ADC}$, and the subsequent receive data processor 136 may operate on samples at another sample rate, $f_{SAMP}$. For example, the received signal may be sampled at approximately two, four, or eight times the chip rate. Depending on the particular receiver design, the ADC sampling rate may or may not be synchronous with the chip rate. Receive data processor 136 is designed to operate on samples at a particular sample rate (e.g., the chip rate) that may be different than the ADC sampling rate. Digital processor 230 can be used to achieve the sample rate conversion. In certain designs, it may be advantageous to operate the subsequent equalizer within receive data processor 136 at a sample rate that is higher than the ADC sampling rate (e.g., $f_{SAMP}=2f_{ADC}$). Digital processor 230 can then be designed and operated to provide the upsampling.

In the embodiment shown in FIG. 2B, data processor 230 includes an upsampler 242, a finite impulse response (FIR) filter 244, and a downsampler 246, all coupled in series. Upsampler 242 receives and upsamples the ADC samples by a factor of P. The upsampling can be achieved by inserting (P-1) zero valued samples between each pair of successive ADC samples. FIR filter 244 then receives and filters the upsampled samples to remove images generated by the upsampling. FIR filter 244 may further perform (match) filtering on the received samples. The filtered samples are provided to decimator 246 and decimated by a factor of Q to generate the (complex) samples $x_i(n)$ that are provided to receive data processor 136. The decimation can be achieved by simply discarding (Q-1) samples from every Q filtered samples.

Data processor 230 can also be implemented with a sample rate converter (especially if P and Q are not integers) or some other design, and this is within the scope of the invention. Also, data processor 230 can be designed to provide additional and/or different functions, and this is also within the scope of the invention.

In the IS-95 CDMA system, a receiver unit is designed to operate at a low signal-to-noise ratio (S/N), where S denotes the desired signal and N denotes the total noise. The total noise includes the thermal noise (No), the interference (Io) due to transmissions by other transmitting sources and transmissions to other receiver units, and inter-symbol interference (ISI). The ISI can be due to multipath or frequency distortion in the received signal due to the transmitter unit, the transmission channel, and the receiver unit. For the IS-95 CDMA system, the low S/N results from the concurrent transmissions of data for multiple users over the same system bandwidth. At the receiver unit, the desired signal is recovered from a highly degraded received signal through the use of spread spectrum processing whereby energy from a longer time period is accumulated to generate a signal having improved S/N.

The processing of a spread spectrum signal is conventionally performed using a rake receiver that searches for strong instances of the received signal (or multipaths), processes the strongest multipaths, and combines the results from the processed multipaths to generate recovered symbols that are more accurate estimates of the transmitted data. The design and operation of a rake receiver are described in further detail below. The rake receiver efficiently combines energy from multiple signal paths and attempts to optimize the S/N. However, the rake receiver is limited in its ability to correct for channel-induced distortions in the received signal because of the limited number of finger processors used to process the multipaths.

For CDMA systems designed to transmit at higher data rates, such as the HDR system, higher S/N is required to support the higher data rates. To achieve a higher S/N, on the forward link of the HDR system, data is transmitted to one user at any given moment. This eliminates the interference due to transmissions for other users. Moreover, the interference from other transmitting base stations may be reduced by operating the HDR system with a reuse factor greater than one and by using a directional antenna at the transmitter unit or the receiver unit, or both. To further improve S/N, ISI (which is typically negligible in the IS-95 CDMA system) may need to be reduced. The present invention provides techniques to reduce ISI due to multipath and channel distortion to achieve higher S/N.

Figure 3:
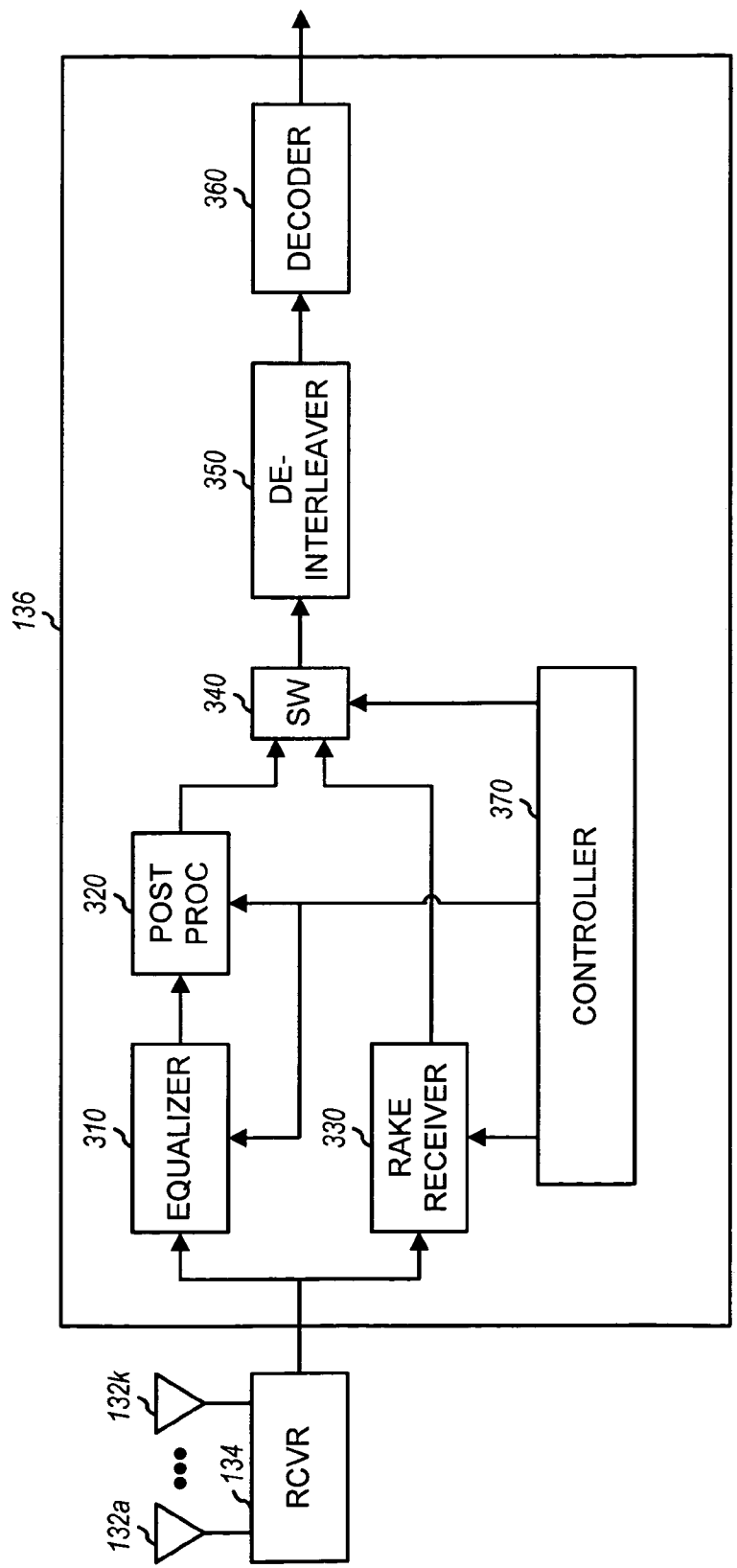
FIG. 3 is a block diagram of a receive data processor within the receiver unit in accordance with an embodiment of the invention.

FIG. 3 is a block diagram of receive data processor 136 in accordance with an embodiment of the invention. In this embodiment, receive data processor 136 includes two signal processing paths that can be operated in parallel to provide improved performance, especially at higher data rates. The first signal processing path includes an equalizer 310 coupled to a post processor 320, and the second signal processing path includes a rake receiver 330.

Within receive data processor 136, the streams of samples from pre-processors 210 are provided to each of equalizer 310 and rake receiver 330. Each stream of samples is generated from a respective received signal. Equalizer 310 performs equalization on the received streams of samples and provides symbol estimates to post processor 320. Depending on the processing performed at transmitter unit 110, post processor 320 may further process the symbol estimates to provide recovered symbols. In particular, if PN spreading and covering are performed at the transmitter unit, post processor 320 may be configured to perform despreading with a complex PN sequence and decovering with one or more channelization codes. Phase rotation (which is achieved via pilot demodulation for a rake receiver) is implicitly achieved by equalizer 310 after the filter coefficients have been adopted.

Rake receiver 330 may be configured to process one or more multipaths of each received signal to provide recovered symbols for that received signal. For each stream of samples, rake receiver 330 may be configured to perform PN despreading, decovering, and coherent demodulation for a number of multipaths. Rake receiver 330 then combines demodulated symbols for all multipaths of a received signal to generate recovered symbols for that received signal. Rake receiver 330 may further combine the recovered symbols for all received signals to provide the overall recovered symbols that are provided from the rake receiver.

The recovered symbols from post processor 320 and rake receiver 330 can be provided to a switch (SW) 340 that selects the recovered symbols from either post processor 320 or rake receiver 330 to provide to a de-interleaver 350. The selected recovered symbols are then reordered by de-interleaver 350 and subsequently decoded by a decoder 360. A controller 370 couples to, and manages the operation of equalizer 310, post processor 320, rake receiver 330, and switch 340.

In accordance with the invention, equalizer 310 can be used to provide equalization of the received signals to reduce the amount of ISI in the received signals. Each received signal is distorted by the characteristics of the transmitter unit, the transmission channel, and the receiver unit. Equalizer 310 can be operated to equalize the overall response for each received signal, thus reducing the amount of ISI. The lower ISI improves S/N and may support higher data rates.

Figure 4A:
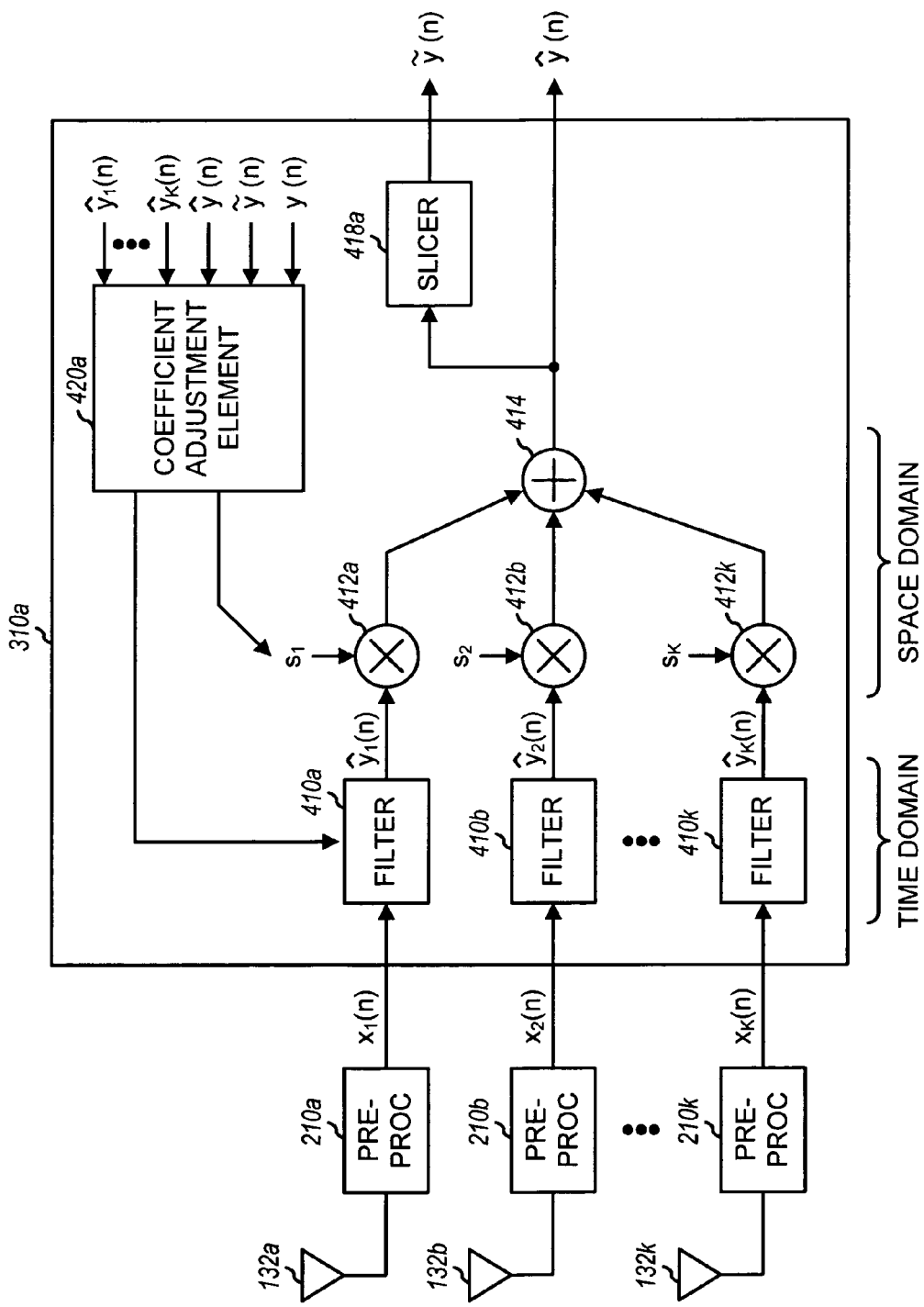
FIGS. 4A and 4B are block diagrams of two embodiments of an equalizer that can be used to implement the equalizer shown in FIG. 3.

FIG. 4A is a block diagram of an embodiment of an equalizer 310a, which can be used to implement equalizer 310 in FIG. 3. As shown in FIG. 4A, the signal received on each antenna 132 is processed by a respective pre-processor 210 to provide a stream of samples, $x_i(n)$. Within equalizer 310a, the samples from pre-processors 210a through 210k are provided to filters 410a through 410k, respectively. Each filter 410 performs equalization of the received samples, $x_i(n)$, based on a particular set of coefficients adapted for the received signal being processed by that filter. The (per antenna) symbol estimates $\hat{y}_1(n)$ through $\hat{y}_K(n)$ from filters 410a through 410k are then provided to multipliers 412a through 412k, respectively, which also receive the scaling factors $s_1$ through $s_K$, respectively. Each multiplier 412 scales the received symbol estimates $\hat{y}_i(n)$ with the scaling factor $s_i$ and provides scaled samples to a summer 414. The scaling factors can complex values, although real values may also be used especially after the coefficients within filters 410 have been adapted. Summer 414 receives and sums the scaled samples from multipliers 412a through 412k to generate the output (combined) symbol estimates $\hat{y}(n)$.

A slicer 418a can be provided within equalizer 310a to receive and slice (i.e., quantize) the output symbol estimates $\hat{y}(n)$ to generate sliced symbol estimates $\tilde{y}(n)$. The sliced symbol estimates can be used to adapt the variables within equalizer 310a (i.e., the coefficients within filters 410 and the scaling factors for multipliers 412) in a data directed adaptation scheme, as described below. The design of slicer 418a can be dependent on the particular quadrature modulation scheme being supported, and more slicing levels can be provided for higher order modulation schemes (e.g., 16 QAM, 64 QAM, and so on). Although not shown in FIG. 4A for simplicity, one or more slicers can also be provided to slice the symbol estimates $\hat{y}_1(n)$ through $\hat{y}_K(n)$ from filters 410a through 410k to generate sliced symbol estimates $\tilde{y}_1(n)$ through $\tilde{y}_K(n)$, respectively.

A coefficient adjustment element 420a receives the symbol estimates $\tilde{y}_1(n)$ through $\tilde{y}_K(n)$, the outputs symbol estimates $\hat{y}(n)$, the sliced symbol estimates $\tilde{y}(n)$, the actual (expected) symbols $y(n)$, or a combination thereof. Coefficient adjustment element 420a then adapts (i.e., trains or adjusts) the coefficients for filters 410a through 410k and the scaling factors for multipliers 412a through 412k based on the received symbol estimates and symbols. Coefficient adjustment element 420a can be designed to implement the Least Mean Square (LMS) algorithm, the Recursive Least Square (RLS) algorithm, the direct matrix inversion (DMI) algorithm, some other algorithm, or a combination thereof. Coefficient adjustment element 420a and the adaptation algorithms are described in further detail below.

Figure 5A:
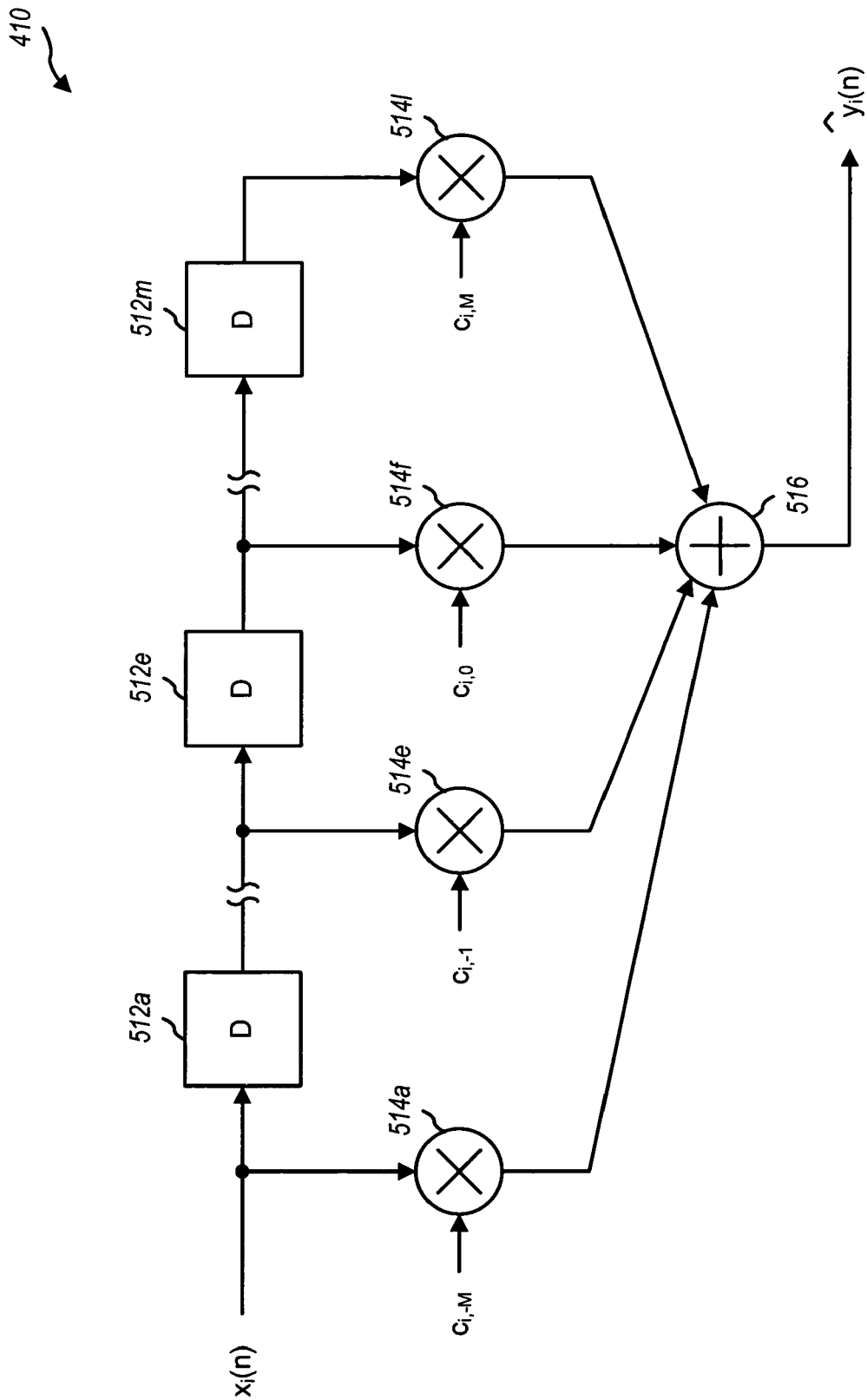
FIG. 5A is a diagram of an embodiment of a FIR filter, which can be used to implement each of the filters shown in FIGS. 4A and 4B.

FIG. 5A is a diagram of an embodiment of filter 410, which can be used to implement each of filters 410a through 410k in FIG. 4A. In this embodiment, filter 410 is implemented with a FIR filter. However, an infinite impulse response (IIR) filter or some other filter architecture can also be used and is within the scope of the invention.

Within filter 410, the received samples $x_i(n)$ are provided to a number of delay elements 512a through 512m coupled in series. Each delay element 512 provides a particular amount of delay (e.g., one clock cycle of the received sample rate clock, $1/f_{SAMP}$). The received samples $x_i(n)$ and the outputs of delay elements 512a through 512m are provided to multipliers 514a through 514l, respectively. Each multiplier 514 also receives a coefficient $c_{i,j}$, scales each received sample with the coefficient, and provides the scaled sample to a summer 516. Summer 516 sums the scaled samples from multipliers 514a through 514l and provides the symbol estimates $\hat{y}_i(n)$. The symbol estimates $\hat{y}_i(n)$ can be computed as:

$$\hat{y}_i(n) = \sum_{j=-M}^{M} c_{i,j}^* \cdot x_i(n-j), \quad \text{Eq (1)}$$

where the symbols (*) denotes a complex conjugate, and (2M+1) is the number of taps of filter 410.

Referring back to FIG. 4A, the output symbol estimates $\hat{y}(n)$ from summer 414 can be computed as:

$$\hat{y}(n) = \sum_{i=1}^{M} s_i^* \cdot \hat{y}_i(n), \quad \text{Eq (2)}$$

where K is the number of assigned signal processing paths within equalizer 310a.

Each filter 410 in FIG. 4A provides a frequency response $C_i(w)$ that attempts to equalize the overall frequency response $G_i(w)$ experienced by the signal being processed by that filter. The overall frequency response $G_i(w)$ of the signal includes the frequency response of the transmitter unit, the transmission channel, and the receiver unit (i.e., everything up to the filter). The coefficients of each filter 410 are "adapted" or "trained" such that reduced ISI can be achieved.

As shown in FIG. 4A, a number of signals may be received via a number of antennas 132 and processed by a corresponding number of preprocessors 210. Each preprocessor 210 provides a stream of samples to a respective filter 410. Each filter 410 can include a number of (2M+1) coefficients. Moreover, the symbol estimates from K filters 410 are scaled by K scaling factors and combined to generate the output symbol estimates $\hat{y}(n)$. Thus, up to $K \cdot (2M+1)+K$ variables may be adjusted for equalizer 310a. The $K \cdot (2M+1)$ coefficients of the K filters 410 and the K scaling factors can be adapted based on various adaptation schemes, some of which are described below.

In a first adaptation scheme, "time-domain" adaptation is performed for the coefficients of filters 410 followed by "space-domain" adaptation for the scaling factors. The time-domain adaptation adapts the coefficients of each filter 410 to provide equalization of the received signal being processed by that filter. The space-domain adaptation then adjusts the scaling factors associated with all assigned filters 410 to provide equalization of equalizer 310a.

For the time-domain adaptation, filters 410a through 410k can be individually adapted based on their respective received samples and their equalized outputs. Prior to the first adaptation, the scaling factors $s_1(n)$ through $s_K(n)$ can be initialized to a particular set of values (e.g., all 1/K). The scaling factors are typically normalized such that their sum total is equal to one, which can be expressed as:

$$\sum_{i=1}^{K} s_i(n) = 1.0. \quad \text{Eq (3)}$$

The set of coefficients, $\underline{c}_i(n)=c_{i,-M}(n),\ldots, c_{i,M}(n)$, for a particular filter 410i can then be adapted based on the samples $x_i(n)$ received by that filter and the samples $y(n)$ expected to be received.

Initially, for each sample period n in which the coefficient adaptation is performed, a set of received samples, $\underline{x}_i(n)=x_i(n-M),\ldots,x_i(n+M)$, is filtered by filter 410i with the set of coefficients $\underline{c}_i(n)$ to generate a symbol estimate $\hat{y}_i(n)$, which can be expressed as:

$$\hat{y}_i(n)=\underline{c}_i^H(n)\cdot\underline{x}_i(n), \quad \text{Eq (4)}$$

where $\underline{c}_i^H(n)$ is the Hermitian transposed (i.e., complex conjugated and transposed) set of coefficients. Equation (4) is written in vector form but is equivalent to equation (1) described above. The symbol estimate $\hat{y}_i(n)$ is then provided to coefficient adjustment element 420a.

Equalizer 310a is typically adapted using known symbols prior to the first time the equalizer is used to process the received samples. For CDMA systems that transmit a pilot reference, the equalizer can be adapted using this pilot reference. If the pilot reference is transmitted using time division multiplexing (TDM), such as in the HDR system, the actual symbols $y(n)$ at the output of equalizer 310a are known during the pilot reference period and can be compared against the (per antenna) symbol estimates $\hat{y}_i(n)$ or the output symbol estimates $\hat{y}(n)$. The error between the actual symbols and the symbol estimates can be computed and used to adapt the equalizer. The generation of the actual symbol $y(n)$ for the HDR system is described in further detail below.

Alternatively, if the pilot reference is transmitted using code division multiplexing (CDM), such as in the IS-95 system, the symbol estimates, $\hat{y}_i(n)$ or $\hat{y}(n)$, can be further processed to undo the CDM processing and generate recovered pilot symbols, $\hat{p}_i(n)$ or $\hat{p}(n)$, respectively, that can then be compared against the actual pilot symbols, $p_i(n)$ or $p(n)$, respectively. Again, the error between the actual pilot symbols and the recovered pilot symbols can be computed and used to adapt the equalizer. The adaptation of equalizer 310a using a TDM pilot reference is described in detail below, and the adaptation of equalizer 310a using a CDM pilot reference is described in a subsequent section.

For a sample period n in which the actual symbol $y(n)$ is known, coefficient adjustment element 420a can receive or generate the actual symbol $y(n)$ for that sample period. An error $e_i(n)$ between the symbol estimate $\hat{y}_i(n)$ from filter 410i and the actual symbol $y(n)$ can then be computed for filter 410i as:

$$e_i(n)=y(n)-\hat{y}_i(n). \quad \text{Eq (5)}$$

The error at any particular point in the processing path can be computed as the difference between the symbol estimate at that point and the expected symbol at that point.

Alternatively, for a sample period n in which the actual symbol y(n) is not known, an error $e_i(n)$ between the symbol estimate $\hat{y}_i$ and the sliced symbol estimate $\tilde{y}_i$ (n) can be computed for filter 410i as:

$$e_i(n) = \tilde{y}_i(n) - \hat{y}_i(n). \quad \text{Eq (6)}$$

The computed error $e_i(n)$, using either equation (5) or (6), is then used to generate a new set of coefficients $\underline{c}_i$ (n+1) for the next sample period.

As noted above, various adaptation algorithms can be used to generate the new coefficients, some of which are described below.

For the LMS algorithm, the new coefficients $\underline{c}_i$ (n+1) can be computed as:

$$\underline{c}_i(N+1) = \underline{c}_i(n) + \underline{x}_i(n) \cdot \mu \cdot e_i^*(n), \quad \text{Eq (7)}$$

where $\mu$ is a unit-less adaptation constant.

For the RLS algorithm, the new coefficients $\underline{c}_i$ (n+1) can be computed as:

$$\underline{k}_i(n) = \frac{\lambda^{-1} P(n) \underline{x}_i(n)}{1 + \lambda^{-1} \underline{x}_i^H(n) P(n) \underline{x}_i(n)}, \quad \text{Eq (8)}$$

$$\underline{c}_i(n+1) = \underline{c}_i(n) + \underline{k}_i(n) e_i^*(n), \text{ and}$$

$$P_i(n+1) = \lambda^{-1} (I(n) - \underline{k}_i(n) \underline{x}_i^H(n)) P(n),$$

where $\lambda$ is a memory weighting factor (typically, $0.95 < \lambda \leq 1.0$), $\underline{k}_i$ (n) is a gain vector, I is the identity matrix (i.e., ones along the diagonal), and P is an inverse correlation matrix. Initially, $P_i(0) = \delta \cdot I$, where $\delta$ is a small positive number (e.g., 0.001).

Figure 6:
FIG. 6 is a diagram of a data frame format for a forward link transmission in the HDR CDMA system.

For the DMI algorithm, the new coefficients $\underline{c}_i$ (n+1) can be computed with a training period of $N_{SYM}$ symbols as follows:

$$\hat{R}_i(n) = \frac{1}{N_{SYM}} \sum_{m=n-N_{SYM}+1}^{n} \underline{x}_i(m) \underline{x}_i^H(m), \quad \text{Eq (9)}$$

$$\hat{\underline{v}}_i(n) = \frac{1}{N_{SYM}} \sum_{m=n-N_{SYM}+1}^{n} \underline{x}_i(m) y^*(m), \text{ and}$$

$$\underline{c}_i(n+1) = \left[ \hat{R}_i(n) \right]^{-1} \hat{\underline{v}}_i(n),$$

where $\hat{R}_i$ (n) is an estimate of an autocorrelation matrix of the received samples (i.e., the filter contents) and $\hat{v}_i$ (n) is a cross-correlation vector of the filter contents and the desired (expected) output. The estimates $\hat{R}_i$ (n) and $\hat{v}_i$ (n) can be aggregated over multiple (possibly disjoint) training intervals. The matrix inversion of $\hat{R}_i$ (n) in equation (9) may be performed only as often as necessary (e.g., once per slot in the HDR system based on the two disjoint pilot references, as shown in FIG. 6).

Each of the LMS, RLS, and DMI algorithm (directly or indirectly) attempts to minimize the mean square error (MSE), which may be expressed as:

$$MSE = E\{|y(n) - \hat{y}_i(n)|^2\}, \quad \text{Eq (10)}$$

where $E\{x\}$ is the expected value of x. The LMS, RLS, DMI, and other adaptation algorithms are described in further detail by Simon Haykin in a book entitled "Adaptive Filter Theory," 3$^{rd}$ edition, Prentice Hall, 1996, which is incorporated herein by reference.

Once filters 410a through 410k are individually adapted in the manner described above, the space-domain adaptation can be performed to adapt the scaling factors. The space-domain adaptation can be achieved in a manner similar to that described above for the time-domain adaptation. Specifically, the coefficients of filters 410a through 410k are fixed, and the scaling factors $s_1(n)$ through $s_K(n)$ are adjusted.

Initially, for each sample period n in which the scaling factors are adapted, each filter 410i filters a set of received samples $\underline{x}_i$ (n) with its set of coefficients $\underline{c}_i$ to generate a symbol estimate $\hat{y}_i(n)$. The symbol estimates $\hat{y}_1(n)$ through $\hat{y}_K(n)$ from filters 410a through 410k are then provided to respective multipliers 412a through 412k and scaled with respective scaling factors $s_1(n)$ through $s_K(n)$ to generate the output symbol estimate $\hat{y}(n)$, which can be expressed as:

$$\hat{y}(n) = \sum_{i=1}^{K} \hat{y}_i(n) \cdot s_i^*(n). \quad \text{Eq (11)}$$

The output symbol estimate $\hat{y}(n)$ is then provided to coefficient adjustment element 420a and used to generate an error e(n), which can be expressed as either:

$$e(n) = y(n) - \hat{y}(n), \text{ or} \quad \text{Eq (12)}$$

$$e(n) = \tilde{y}(n) - \hat{y}(n), \quad \text{Eq (13)}$$

depending on whether the actual symbols are known (equation 12) or not known (equation 13). The computed error e(n) is then used to generate new scaling factors $s_1(n+1)$ through $S_K$ (n+1) (i.e., $\underline{s}(n+1)$) using the LMS, RLS, DMI, or some other algorithm, in similar manner as that described above for the adaptation of the filter coefficients.

The time-domain and space-domain adaptations can be iterated a number of times (e.g., using the same or different pilot reference) to achieve the desired performance. The iterative adaptation can be performed as follows:

1) initialize the scaling factors to 1.0 (i.e., $s_1 = s_2 = \ldots = s_K = 1/K$);
2) initialize the coefficients of each of filters 410a through 410k (e.g., in a manner described below);
3) perform time-domain adaptation for the coefficients $\underline{c}_i$ (n) of each filter 410i;
4) fix the coefficients $\underline{c}_1$ through $\underline{c}_K$ for filters 410a through 410k;
5) perform space-domain adaptation for the scaling factors $s_1(n)$ through $s_K(n)$ with the filter coefficients fixed;
6) fix the scaling factors; and
7) repeat steps 3 through 5 a number of times until the desired results are obtained.

Once the coefficients of filters 410a through 410k and the scaling factors are adapted, the symbol estimates $\hat{y}(n)$ from equalizer 310a represent good estimates of the transmitted samples.

After the initial adaptation, the equalizer can be (periodically) re-adapted when the known symbols are again received (e.g., during subsequent pilot reference periods). Alternatively or additionally, equalizer 310a can be adapted using a decision directed adaptation scheme (e.g., during actual use, when the actual symbols are typically not known). Decision directed adaptation can be performed based on the error between the sliced symbol estimates (i.e., the expected signal level of the symbol estimates) and the symbol estimates (i.e., the actual level of the symbols as they are received).

The first adaptation scheme performs time-domain and space-domain adaptations separately and sequentially, which reduces the complexity of the required computations. For example, if each filter 410 includes (2M+1) coefficients, the time-domain adaptation can be achieved by performing operations on vectors of length 2M+1 and (possibly) matrices of dimension 2M+1 by 2M+1. And if K signal processing paths are operated in parallel to process K received signals, the space-domain adaptation can be achieved by performing operations on vectors of length K and (possibly) matrices of dimension K by K.

In a second adaptation scheme, the time-domain and space-domain adaptations are performed simultaneously for the coefficients and scaling factors within equalizer 310a. In this embodiment, all filters 410a through 410k are operated in parallel to filter their respective streams of samples $x_1(n)$ through $x_K(n)$. The symbol estimates $\hat{y}_1(n)$ through $\hat{y}_K(n)$ from filters 410a through 410k can be computed as:

$$\hat{y}_1(n) = \underline{c}_1^H(n) \cdot \underline{x}_1(n),$$

.

.

.

$$\hat{y}_K(n) = \underline{c}_K^H(n) \cdot \underline{x}_K(n). \qquad \text{Eq (14)}$$

The symbol estimates $\hat{y}_1(n)$ through $\hat{y}_K(n)$ are then provided to multipliers 412a through 412k, respectively, scaled by the respective scaling factors $s_1(n)$ through $s_K(n)$, and combined to generate the output symbol estimate $\hat{y}(n)$, which can be computed as shown in equation (11).

An error e(n) between the symbol estimate $\hat{y}(n)$ and the actual symbol y(n) or the sliced symbol estimate $\tilde{y}(n)$ is computed, as shown in equation (12) or (13), respectively. The error e(n) is then used to simultaneously adapt the K sets of filter coefficients $\underline{c}_1(n)$ through $\underline{C}_K(n)$ (with the K scaling factors $s_1(n)$ through $s_K(n)$ fixed). The K set of filter coefficients can be concatenated into one vector of length K·(2M+1), which is adjusted by the error e(n). In this embodiment, up to K·(2M+1) variables are adapted simultaneously.

In the second adaptation scheme, for a particular set of scaling factors, the filter coefficients are adapted simultaneously by performing operations on vectors of length K·(2M+1) and (possibly) matrices of dimension K·(2M+1) by K·(2M+1). The required computations can be more complicated than those performed for the first adaptation scheme described above. However, improved performance may be achieved since all coefficients can be jointly considered to equalize the received signals such that the output symbol estimates $\hat{y}(n)$ are good estimate of the actual symbol y(n). For example, the coefficients of the filter used for antenna 1 can depend on the signal(s) received via other antenna(s).

The adaptation of the filter coefficients and the scaling factors can be achieved with the assistance of rake receiver 330. In a typical design, rake receiver 330 includes a searcher element and a number of finger processors. The searcher element processes the samples for a particular received signal at various time offsets, possibly as directed by controller 370, and searches for the strongest multipaths. For a CDMA system, the searcher element typically performs a correlation of the received samples with a (complex) PN sequence that was used to spread the samples at the transmitter unit. The searcher element can be designed to perform the correlation at a specific time offset or at multiple time offsets. Each time offset corresponds to a specific delay of the PN sequence relative to an absolute (zero delay) PN sequence. The searcher element may also be designed to provide a (complex) correlation result for each time offset being examined or just correlation results that exceed a particular threshold. The searcher element or controller 370 can be designed to maintain a list of correlation results and their corresponding time offsets for each received signal.

Based on the list of correlation results for all received signals, controller 370 can identify the strongest multipath (e.g., the multipath having the largest magnitude or energy). The functions performed by the searcher element and finger processors are described in further detail below.

In an embodiment, the initial values for the filter coefficients can be set based on the correlation results from rake receiver 330. For each received signal, rake receiver 330 can be operated to search for the strongest multipaths. The magnitude of the correlation results for the strongest multipaths for each received signal can be ranked. The index Ji corresponding to the strongest multipath for a particular received signal can be determined as:

$$Ji = \arg\left\{\max_j |\alpha_{i,j}|\right\}. \qquad \text{Eq (15)}$$

The strongest multipath for the particular received signal can then be determined as:

$$|\alpha_{Ji}| = \max_j |\alpha_{i,j}|, \qquad \text{Eq (16)}$$

where $|\alpha_{i,j}|$ is the magnitude of the $j^{th}$ multipath of the $i^{th}$ received signal and $|\alpha_{Ji}|$ is the magnitude of the strongest multipath for the $i^{th}$ received signal. Similarly, the strongest multipaths for all received signals can be ranked and the strongest multipath among these can be identified as follows:

$$|\alpha_I| = \max_i |\alpha_{Ji}|, \qquad \text{Eq (17)}$$

where $|\alpha_I|$ is the magnitude of the strongest multipath for all received signals.

Once the strongest multipath for all received signals is determined, the time offset corresponding to this multipath can be identified. The coefficient $c_{i,0}(n)$ for each filter 410 can then be initialized to one of the following: (1) a value related to a "finger value," which is indicative of the received signal quality of the strongest multipath (e.g., $c_{i,0}(n) = \gamma \alpha_{Ji}^*$, where $\gamma$ is a constant that may be dependent on the noise variance), (2) a value of one (1.0), or some other value. The remaining coefficients can each be initialized to zero (i.e., $C_{i,-M}(n) = \ldots = c_{i,-1}(n) = \ldots = c_{i,1}(n) = \ldots c_{i,M}(n) = 0.0$). The time offset, $\tau_{Ji}$, corresponding to the strongest multipath, $\alpha_{Ji}$, can be separated into a "coarse" portion and a "fine" portion. The coarse portion can be used as a coarse adjustment to properly generate the actual symbols y(n) used to adapt the coefficients and scaling factors, as described below. The fine portion can be used as a fine adjustment to specify the time epic of the received samples $x_i(n)$. Specifically, the fine portion can be used by digital processor 230 to adjust the timing of the resampling clock, which enables digital processor 230 to generate received samples $x_i(n)$ aligned (in time) to the time offset. The time offset for the generation of the actual symbols y(n) also takes into account the number of taps of each filter 410 and the initial values of the coefficients.

The scaling factors can also be initialized with the assistance of rake receiver 330. For example, each of the scaling factors can be initialized to a value that is related to the magnitude of the strongest multipath of the received signal being scaled with that scaling factor. Thus, the scaling factors $s_1(n)$ through $s_K(n)$ can be set to values related to $\alpha_{j1}$ through $\alpha_{jK}$, respectively. Alternatively, the scaling factors can each be set to a particular value (e.g., 1/K) prior to the adaptation. Other methods to initialize the coefficients and scaling factors can also be used and are within the scope of the invention.

Figure 4B:
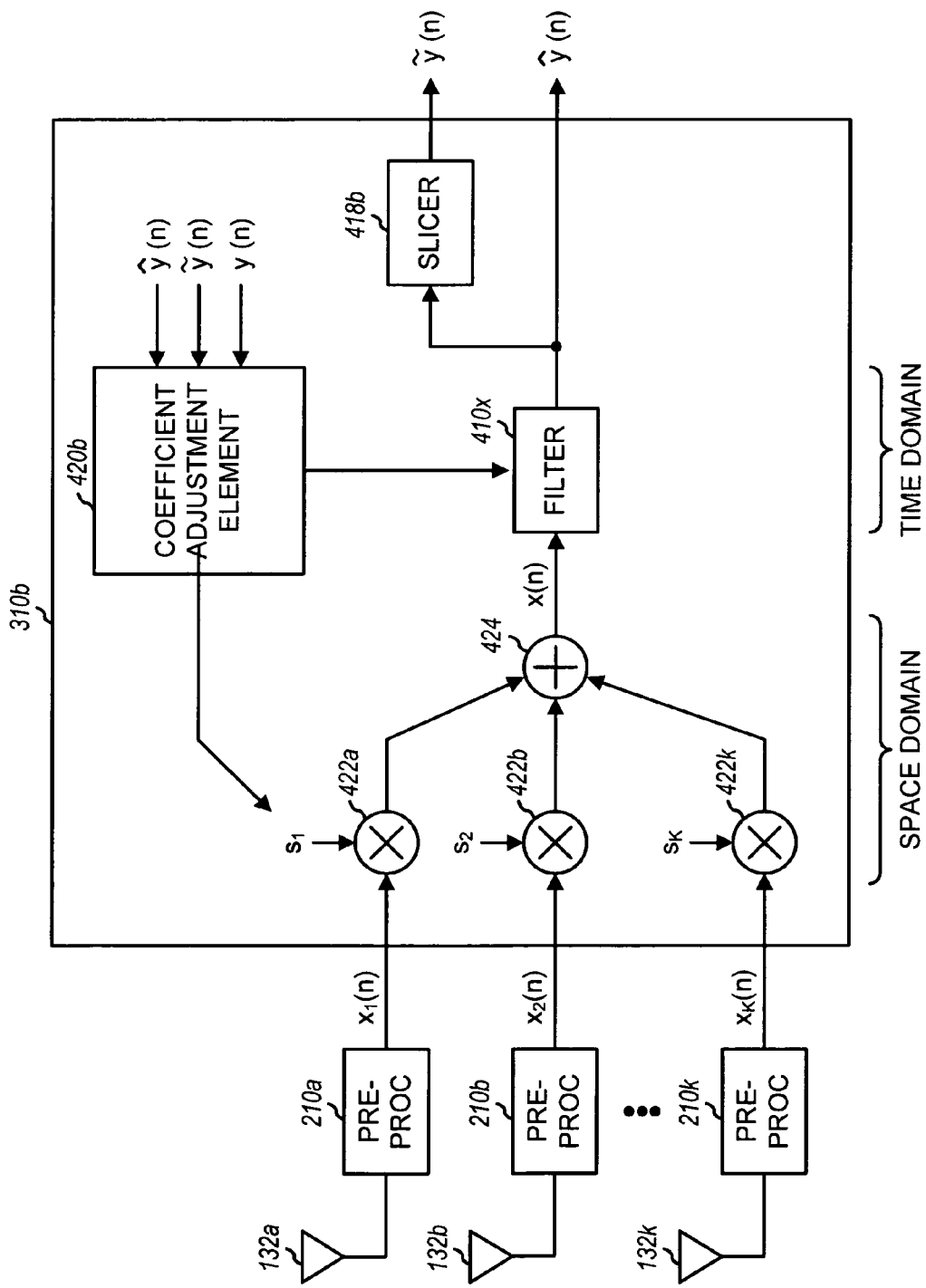

FIG. 4B is a block diagram of an embodiment of another equalizer 310b, which can also be used to implement equalizer 310 in FIG. 3. Unlike equalizer 310a in FIG. 4A, which performs equalization followed by spatial-domain combination, equalizer 310b in FIG. 4B performs spatial-domain combination followed by equalization. The spatial-domain combination can be viewed as achieving beam forming with an array of K antennas 132. The architecture of equalizer 310b is simpler than the architecture of equalizer 310a and has a dimensionality that is approximately a factor of K less complex (i.e., equalizer 310b has (2M+1)+K variables versus K·(2M+1)+K variables for equalizer 310a). Equalizer 310b can provide good estimates for certain operating conditions (e.g., if the scattering is not too great and if the antennas have approximately similar frequency response with some phase shifts).

As shown in FIG. 4B, the signal received on each antenna 132 is processed by a respective pre-processor 210 to provide a stream of samples, $x_i(n)$. Within equalizer 310b, the sample streams $x_1(n)$ through $x_K(n)$ from pre-processors 210a through 210k are provided to multipliers 422a through 422k, respectively, which also receive the respective scaling factors $s_1$ through $s_K$. Each multiplier 422 scales the received samples $x_i(n)$ with the scaling factor $S_i$ and provides scaled samples to a summer 424. The scaling factors for multipliers 422 are typically complex values that allow for a complex combination of the signals received via multiple antennas 132. Summer 424 receives and sums the scaled samples from multipliers 422a through 422k to generate spatially combined samples x(n), which are then provided to a filter 410x.

Filter 410x performs equalization on the samples x(n) based on a particular set of coefficients. The symbol estimates ŷ(n) from filter 410x are provided as the output of equalizer 310b and are also provided to a coefficient adjustment element 420b. Filter 410x can be implemented with filter 410 shown in FIG. 5A. Similar to that described above for equalizer 310a, a slicer 418b can be provided within equalizer 310b to receive and slice the symbol estimates ŷ(n) to generate sliced symbol estimates ỹ(n).

Coefficient adjustment element 420b also receives the actual symbols y(n), the symbol estimates ŷ(n), and the sliced symbol estimates ỹ(n), or a combination thereof. Coefficient adjustment element 420b then adapts the coefficients of filter 410x and the scaling factors $s_1$ through $s_K$ based on the received symbol estimates and symbols. Coefficient adjustment element 420b can also be designed to implement the LMS, RLS, DMI, or some other algorithm, or a combination thereof. Coefficient adjustment element 420b can be implemented similar to coefficient adjustment element 420a in FIG. 4A.

The adaptation of the scaling factors and the coefficients within equalizer 310b can be achieved using adaptation schemes similar to those described above for equalizer 310a.

In the first adaptation scheme, time-domain adaptation is performed first followed by space-domain adaptation. To perform the time-domain adaptation, the scaling factors are initially set to a particular set of values and the filter coefficients are then adapted. The initial values for the scaling factors may be determined, for example, using direction of arrival (DOA) estimation, which is known in radar theory and described by S. Haykin and A. Steinhardt, in a book entitled "Adaptive Radar Detection and Estimation," John Wiley and Sons, June 1992. Alternatively, the scaling factors may each be initialized, for example, to 1/K. With the scaling factors fixed, the filter coefficients can then be adapted using the LMS, RLS, DMI, or some other algorithm, similar to that described above.

Once the first iteration of the time-domain adaptation is completed, the coefficients can be fixed and the space-domain adaptation can be performed (e.g., over the same pilot reference or a different pilot reference). To perform the space-domain adaptation, the symbol estimates ŷ(n) are computed and used to adapt the scaling factors, again using the LMS, RLS, DMI, or some other algorithm, similar to that described above. The time-domain and space-domain adaptations may be iterated a number of times to achieve the desired results. Similar to that described above for equalizer 310a, rake receiver 330 can be used to initially set the coefficients for filter 410x and the scaling factors. For example, rake receiver 330 can be operated to search for the strongest multipaths for each received signal being processed. The strongest multipath for all received signals can be identified, based on equation (17). The coefficients for filter 410x can be initialized based on the magnitude of the strongest multipath. The time offset corresponding to this multipath can be used to properly generate the actual symbols y(n) used for the adaptation.

Also, the strongest multipath for each received signal can be used to initially set the corresponding scaling factor. For example, the initial value for the scaling factor $s_1$ can be set based on the magnitude of the strongest multipath for the signal received via antenna 132a, the initial value for the scaling factor $s_2$ can be set based on the magnitude of the strongest multipath for the signal received via antenna 132b, and so on. The initial values for the scaling factors can also be set based on finger values that are indicative of the received signal quality (S/N).

For some CDMA systems, such as the HDR system, a pilot reference is time division multiplexed (TDM) with other data and transmitted from a base station to the remote terminals. For these CDMA systems, the filter coefficients and scaling factors can be adapted using the transmitted pilot reference. Thereafter, the coefficients and scaling factors are fixed and used to process data that is transmitted in the time periods between the pilot references.

FIG. 6 is a diagram of a data frame format for a forward link transmission in the HDR CDMA system. On the forward link, traffic data, pilot reference, and signaling data are time division multiplexed in a frame and transmitted from a base station to a remote terminal. Each frame covers a time unit referred to as a slot (e.g., 1.67 msec for a particular HDR design). Each slot includes traffic data fields 602a, 602b, and 602c, pilot reference fields 604a and 604b, and signaling data (OH) fields 606a and 606b. Traffic data fields 602 and pilot reference fields 604 are used to send traffic data and pilot reference, respectively. Signaling data fields 606 are used to send signaling information such as, for example, forward link activity (FAC) indicators, reverse link busy indicators, reverse link power control commands, and so on. The FAC indicators indicate whether the base station has traffic data to send in a particular number of slots in the future. The reverse link busy indicators indicate whether the reverse link capacity limit of the base station has been reached. And the power control commands direct the transmitting remote terminals to increase or decrease their transmit power.

In accordance with the HDR CDMA system, prior to transmission, the traffic data is covered with Walsh codes corresponding to the channels to be used for the data transmission, and the power control data for each remote terminal is covered with the Walsh code assigned to the remote terminal. The pilot reference, covered traffic data, and power control data are then spread with a complex PN spreading sequence generated by multiplying the short IPN and QPN spreading sequences assigned to the particular transmitting base station with the long PN sequence assigned to the recipient remote terminal. At the highest date rates, the bit rate may match or exceed the chip rate of the PN spreading sequence and the Walsh codes, and no direct sequence spreading of the data is achieved. The data frame format and the processing of the forward link transmission for the HDR system is described in further detail in the aforementioned U.S. patent application Ser. No. 08/963,386, now U.S. Pat. No. 6,574,211.

For some CDMA systems, such as the IS-95 CDMA system, a pilot reference is code division multiplexed (CDM) with other data and transmitted from a base station to the remote terminals. For these CDMA systems, the filter coefficients and scaling factors can be adapted using the transmitted CDM pilot reference. However, since the pilot reference is code division multiplexed with other data, additional processing is performed on the per antenna symbol estimates $\hat{y}_i(n)$ or the output symbol estimates $\hat{y}(n)$ to extract the transmitted pilot reference.

Figure 5B:
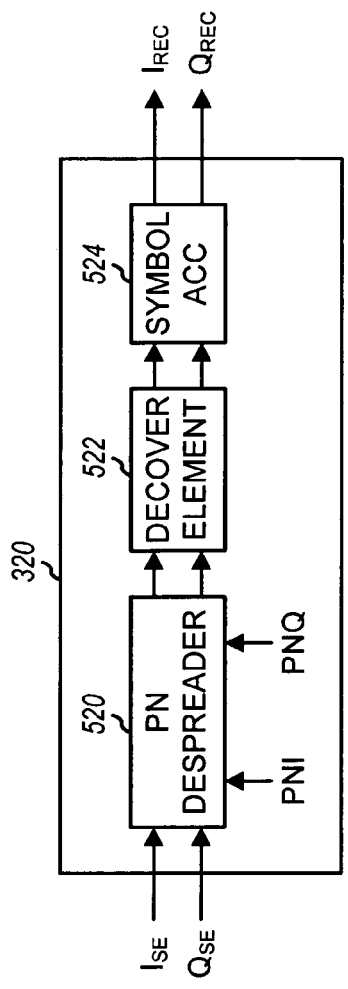
FIG. 5B is a block diagram of an embodiment of a post processor used to process the symbol estimates from the equalizer to generate recovered symbols.

For the IS-95 CDMA system, the pilot reference (an all ones sequence) is covered with a 64-chip all zeros Walsh sequence, combined with other covered data, and spread with the PN sequence. The transmitted CDM pilot reference can be recovered by processing the output symbol estimates $\hat{y}(n)$ in a complementary manner. Referring to FIG. 5B, which is described in greater detail below, within post processor 320, the symbol estimates $\hat{y}(n)$ are despread with the PN sequence, decovered with the pilot Walsh sequence, and accumulated over the (64-chip) pilot symbol period to generate recovered pilot symbols $\hat{p}(n)$. The decovering removes the data on the other traffic channels, which have been covered with Walsh sequences that are orthogonal to the pilot Walsh sequence.

The error e(n) between the recovered pilot symbols $\hat{p}(n)$ and the actual (expected) pilot symbol p(n) can then be computed as:

$$e(n)=p(n)-\hat{p}(n). \quad \text{Eq (18)}$$

The error e(n) can then be used to adapt the filter coefficients and scaling factors using any combination of adaptation scheme and adaptation algorithm (e.g., LMS, RLS, or DMI) described above. For equalizer 310a in FIG. 4A, the adaptation can also be performed using the per antenna symbol estimates $\hat{y}_i(n)$ from each filter 410. The symbol estimates $\hat{y}_i(n)$ can be processed by post processor 320 in the manner described above to generate recovered pilot symbols $\hat{p}_i(n)$. The error $e_i(n)$ between the recovered pilot symbols $\hat{p}_i(n)$ and the expected pilot symbol $p_i(n)$ can then be computed as:

$$e_i(n)=p_i(n)-\hat{p}_i(n). \quad \text{Eq (19)}$$

Generally, an error between the recovered symbols (e.g., $\hat{y}(n)$ or $\hat{p}(n)$) and the expected symbol (e.g., y(n) or p(n)) can be computed at any particular point in the receiver unit. Proper processing is performed such that "equivalent" or "like-kind" symbols are being compared.

For CDMA systems that transmit a CDM pilot reference, an error e(n) may be computed for each pilot symbol period (e.g., every 64 chips for the IS-95 CDMA system). If the CDM pilot reference is transmitted continuously, such as for the IS-95 CDMA system, the adaptation can also be performed in a continuous manner, albeit at a lower pilot symbol rate. For CDMA systems that transmit a TDM pilot reference, an error may be computed for each chip period. However, the adaptation using the TDM pilot reference is typically only performed during the pilot reference period.

As noted above, information from the rake receiver can be used to (1) initialize the filter coefficients prior to the first adaptation, (2) properly generate the expected symbols, y(n) or p(n), and (3) specify the time epic of the received samples $x_i(n)$, as described above. For equalizer 310a in FIG. 4A, the center coefficient $c_{i,0}(n)$ of each filter 410 can be initialized to the finger value (e.g., $c_{i,0}(n)=\gamma\alpha_{ji}^*$) of the strongest multipath of the signal being processed by that filter. The time offset $\tau_{ji}$ of the strongest multipath can be used to generate the expected symbols y(n) or the expected pilot symbols p(n), and to generate received samples $x_i(n)$ that are aligned in time to the time offset. The expected symbols y(n) and p(n) are also generated by taking into account the delay associated with the processing elements up to the point where the error is computed. For example, for a particular time offset, $\tau_{ji}$ the expected pilot symbols p(n) would be generated with a delay relative to expected symbols y(n), to account for the delay of post processor 320.

The filter coefficients and scaling factors can also be adapted using the received data. The received samples can be processed, decoded, and CRC checked to determine whether a data packet was received without error. A correctly received data packet can then be re-encoded and re-processed in a manner similar to that performed at the transmitter unit. The re-generated symbols can then be compared against the recovered symbols (e.g., $\hat{y}(n)$), and the error between these can be used to adapt the filter coefficients and scaling factors. The recovered symbols are appropriately buffered to account for the decoding, re-encoding, and re-processing delays.

Figure 7:
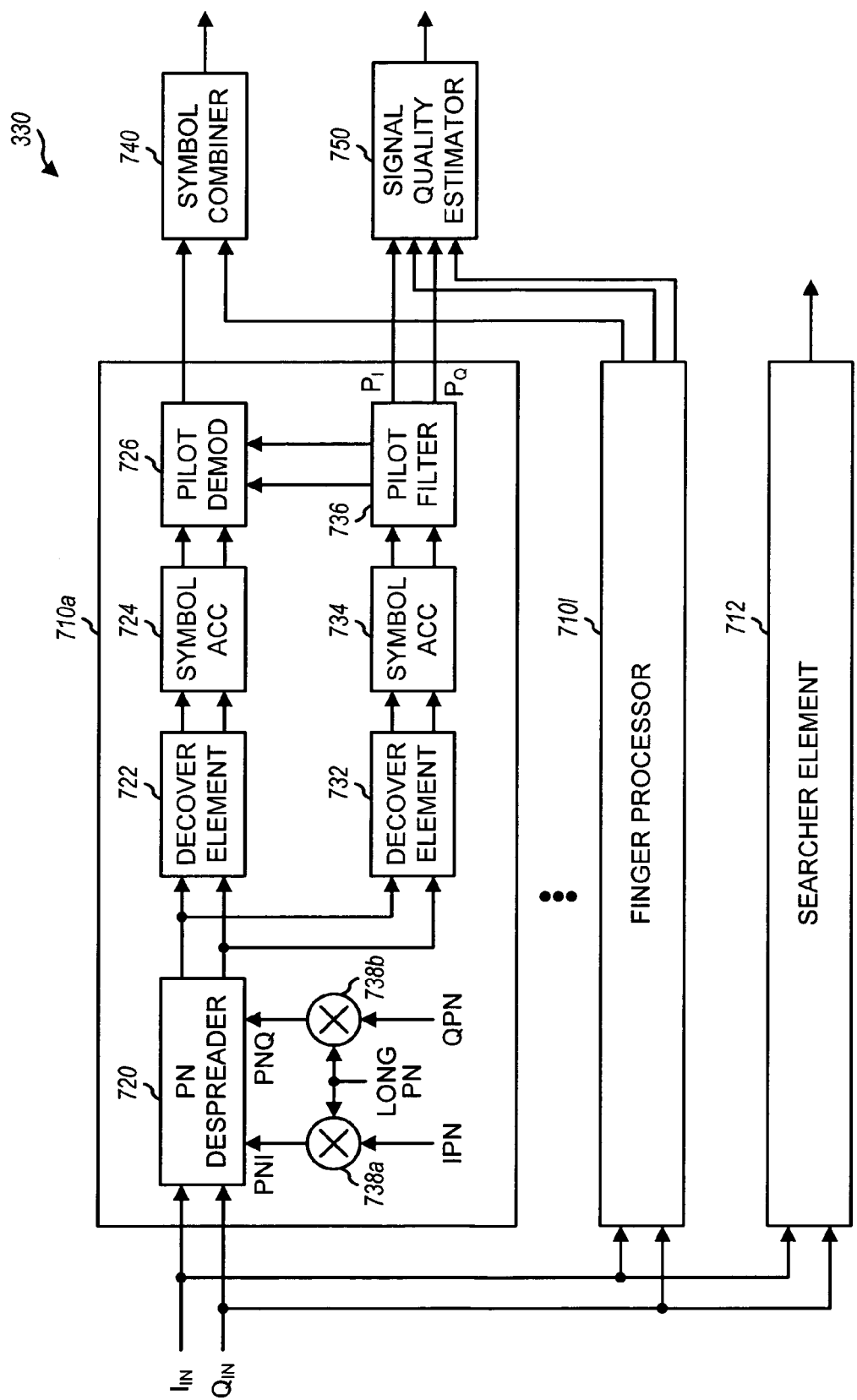
FIG. 7 is a block diagram of an embodiment of a rake receiver.

FIG. 7 is a block diagram of an embodiment of rake receiver 330. Due to multipath and other phenomena, a transmitted signal may reach a receiver unit via multiple signal paths. For improved performance, the rake receiver is designed with the capability to process multiple (and strongest) instances of the received signal (or multipaths). For a conventional rake receiver design, a number of finger processors 710 are provided to process a number of multipaths. Each finger processor 710 comprises a finger of the rake receiver and can be assigned to process a particular multipath.

As shown in FIG. 7, the received $I_{IN}$ and $Q_{IN}$ samples from a particular pre-processor 210 are provided to a number of finger processors 710a through 710l. Within each assigned finger processor 710, the received $I_{IN}$ and $Q_{IN}$ samples are provided to a PN despreader 720, which also receives a complex PN sequence, PNI and PNQ. The complex PN sequence is generated in accordance with the particular design of the CDMA system being implemented and, for the HDR system, is generated by multiplying the short IPN and QPN sequences with the long PN sequence by multipliers 738a and 738b. The short IPN and QPN sequences are used to spread the data at the transmitting base station, and the long PN sequence is assigned to the recipient receiver unit and used to scramble the data. The PNI and PNQ sequences are generated with a time offset corresponding to the particular multipath being processed by that finger processor.

PN despreader 720 performs a complex multiply of the complex $I_{IN}$ and $Q_{IN}$ samples with the complex PN sequence and provides complex despread $I_{DES}$ and $Q_{DES}$ samples to decover elements 722 and 732. Decover element 722 decovers the despread samples with one or more channelization codes (e.g., Walsh codes) that were used to cover the data and generates complex decovered samples. The decovered samples are then provided to a symbol accumulator 724 that accumulates the samples over the length of the channelization codes to generate decovered symbols. The decovered symbols are then provided to a pilot demodulator 726.

For the HDR system, a pilot reference is transmitted during a portion of the forward link transmission. Thus, decover element 732 decovers the despread samples with the particular channelization code (e.g., a Walsh code 0 for the HDR system) that was used to cover the pilot reference at the base station. The decovered pilot samples are then provided to an accumulator 734 and accumulated over a particular time interval to generate pilot symbols. The accumulation time interval can be the duration of the pilot channelization code, an entire pilot reference period, or some other time interval. The pilot symbols are then provided to a pilot filter 736 and used to generate pilot estimates that are provided to pilot demodulator 726. The pilot estimates are estimated or predicted pilot symbols for the time period when data is present.

Pilot demodulator 726 performs coherent demodulation of the decovered symbols from symbol accumulator 724 with the pilot estimates from pilot filter 736 and provides demodulated symbols to a symbol combiner 740. Coherent demodulation can be achieved by performing a dot product and a cross product of the decovered symbols with the pilot estimates. The dot and cross products effectively perform a phase demodulation of the data and further scale the resultant output by the relative strength of the recovered pilot. The scaling with the pilots effectively weighs the contributions from different multipaths in accordance with the quality of the multipaths for efficient combining. The dot and cross products thus perform the dual role of phase projection and signal weighting that are characteristics of a coherent rake receiver.

Symbol combiner 740 receives and coherently combines the demodulated symbols from all assigned finger processors 710 to provide recovered symbols for a particular received signal being processed by the rake receiver. The recovered symbols for all received signals may then be combined, as described below, to generate overall recovered symbols that are then provided to the subsequent processing element.

Searcher element 712 can be designed to include a PN despreader, a PN generator, and a signal quality measurement element. The PN generator generates the complex PN sequence at various time offsets, possibly as directed by controller 370, which are used in the search for the strongest multipaths. For each time offset to be searched, the PN despreader receives and despreads the $I_{IN}$ and $Q_{IN}$ samples with the complex PN sequence at the particular time offset to provide despread samples. The signal quality of the despread samples is then estimated. This can be achieved by computing the energy of each despread sample (i.e., $I_{DES}^2 + Q_{DES}^2$) and accumulating the energy over a particular time period (e.g., the pilot reference period). Searcher element performs the search at numerous time offsets, and the multipaths having the highest signal quality measurements are selected. The available finger processors 710 are then assigned to process these multipaths.

The design and operation of a rake receiver for a CDMA system is described in further detail in U.S. Pat. No. 5,764,687, entitled "MOBILE DEMODULATOR ARCHITECTURE FOR A SPREAD SPECTRUM MULTIPLE ACCESS COMMUNICATION SYSTEM," and U.S. Pat. No. 5,490,165, entitled "DEMODULATION ELEMENT ASSIGNMENT IN A SYSTEM CAPABLE OF RECEIVING MULTIPLE SIGNALS," both assigned to the assignee of the present invention and incorporated herein by reference.

In the embodiment shown in FIG. 2A, a number of forward link signals are received by antennas 132a through 132k and processed by pre-processors 210a through 210k, respectively, to generate sample streams $x_1(n)$ through $x_K(n)$. Thus, a number of rake receivers can be provided to process the K sample streams. A combiner may then be used to combine the recovered symbols from all received signals being processed. Alternatively, one or more rake receivers can be time division multiplexed to process the K sample streams. In this TDM rake receiver architecture, the samples from the K streams can be temporarily stored to a buffer and later retrieved and processed by the rake receiver.

For each received signal, rake receiver 330 can be operated to process up to L multipaths, where L represents the number of available finger processors 710. Each of the L multipaths corresponds to a particular time offset that is identified with the assistance of searcher element 712. Controller 370 or searcher element 712 can be designed to maintain a list of the magnitude of the strongest multipath ($\alpha_{j_i}$) and its corresponding time offset ($\tau_i$) for each of the K received signals being processed. These magnitudes and time offsets can be used to initialize the coefficients and scaling factors of equalizer 310, as described above. In one implementation, the magnitude of each multipath of interest can be computed as the square root of the accumulated energy value divided by the number of samples (N) used in the accumulation.

FIG. 5B is a block diagram of an embodiment of post processor 320 used to process the symbol estimates $\hat{y}(n)$ generated from the received signals. Post processor 320 is operated to undo the PN spreading and covering that may have been performed at the transmitter unit. For example, prior to transmission, the HDR system performs PN spreading and covering of the data at lower data rates. At the higher data rates (matching or exceeding the chip rate), the PN spreading and covering may result in symbol inversion (i.e., changes in polarity) but no direct sequence spreading. Thus, post processor 320 can be operated to perform PN despreading and decovering at the lower data rates and symbol inversions at the higher data rates. Generally, post processor 320 is designed to perform functions that are complementary to those performed at the transmitter unit.

Within post processor 320, the symbol estimates are provided to a PN despreader 520, which also receives a complex PN sequence having the same time offset as that used to adapt the filter coefficients. PN despreader 520 despreads the symbol estimates with the complex PN sequence and provides the despread samples to a decover element 522. Decover element 522 then decovers the samples with one or more channelization codes used to cover the data at the base station. The decovered samples for each channel are then accumulated over the length of the channelization codes by a symbol accumulator 524 to generate recovered symbols that are then provided to the subsequent processing element.

Equalizer 310, post processor 320, and rake receiver 330 can be time division multiplexed to process samples of all received signals using a single set of processing elements. Also, some of the elements within post processor 320 are similar with those within rake receiver 330. Thus, post processor 320 and rake receiver 330 can be designed and operated such that at least some of the common functions can be performed by a shared set of processing elements.

During the adaptation period for filters 410 shown in FIGS. 4A and 4B, the actual symbol y(n) can be generated based on the time offset of the strongest multipath for all received signals. For the HDR system, the pilot reference is an all-ones sequence and the channelization code used to cover the pilot reference is Walsh code 0 (i.e., the all-zeros sequence). The pilot reference is then despread with the complex PN sequence. Thus, the transmitted pilot reference is equal to the complex PN sequence for the time duration in which the pilot reference is transmitted.

At the receiver unit, the actual symbol y(n) during the pilot reference period can be generated as the complex PN sequence at the time offset corresponding the strongest multipath of all received signals (i.e., y(n)=PNI(n)+jPNQ(n).

Referring back to FIG. 3, receive data processor 136 includes two signal processing paths that can be operated to process the received signals. The first signal processing path includes equalizer 310 and post processor 320, and the second signal processing path includes rake receiver 330. In an embodiment, the two signal processing paths can be operated in parallel (e.g., during the adaptation period) and a signal quality estimate can be computed for each of the signal processing paths. The signal processing path that provides the better signal quality can then be selected to process the received signals.

For a conventional rake receiver, the received signal quality can be estimated by computing the signal-to-noise (S/N) ratio. For CDMA systems that transmit TDM pilot reference, the S/N can be computed during the pilot reference period when the received signal is known. A signal quality estimate can be generated for each assigned finger processor. The estimates for all assigned finger processors can then be weighted and combined to generate an overall S/N, which can be computed as:

$$S/N_{RAKE} = \frac{\left(\sum_{i=1}^{K} \beta_i \cdot \sqrt{Es_i}\right)^2}{\sum_{i=1}^{K} \beta_i \cdot Nt_i} \quad \text{Eq (20)}$$

where β is the weighting factors used by the rake receiver to combine the demodulated symbols from the assigned finger processors to provide the recovered symbols that are improved estimates of the transmitted data, Es is the energy-per-symbol for the desired signal (e.g., the pilot), and Nt is the total noise on the received signal being processed by the finger processor. Nt typically includes thermal noise, interference from other transmitting base stations, interference from other multipaths from the same base station, and other components. The energy-per-symbol can be computed as:

$$Es = \frac{1}{N_{SYM}} \sum_{i=1}^{N_{SYM}} (P_I^2(i) + P_Q^2(i)), \quad \text{Eq (21)}$$

where $P_I$ and $P_Q$ are the inphase and quadrature filtered pilot symbols and $N_{SYM}$ is the number of symbols over which the energy is accumulated to provide the Es value. Referring to FIG. 7, the filtered pilot symbols can be generated by accumulating the despread samples over the length of the channelization code used to cover the pilot reference. The total noise can be estimated as the energy of the variations in the energy of the desired signal, which can be computed as:

$$Nt = \frac{1}{N_{SYM}-1} \left\{ \sum_{i=1}^{N_{SYM}} (P_I^2(i) + P_Q^2(i)) - \frac{1}{N_{SYM}} \left(\sum_{i=1}^{N_{SYM}} P_I(i)\right)^2 - \frac{1}{N_{SYM}} \left(\sum_{i=1}^{N_{SYM}} P_I(i)\right)^2 \right\}. \quad \text{Eq (22)}$$

The measurement of the received signal quality is described in further detail in U.S. Pat. No. 5,903,554, entitled "METHOD AND APPARATUS FOR MEASURING LINK QUALITY IN A SPREAD SPECTRUM COMMUNICATION SYSTEM," and U.S. Pat. No. 5,799,005, entitled "SYSTEM AND METHOD FOR DETERMINING RECEIVED PILOT POWER AND PATH LOSS IN A CDMA COMMUNICATION SYSTEM," both assigned to the assignee of the present invention and incorporated herein by reference.

For the signal processing path that includes equalizer 310, the signal quality can be estimated using various criteria, including a mean square error (MSE). Again, for CDMA systems that transmit TDM pilot reference, the MSE can be estimated during the pilot reference period, and can be computed as:

$$MSE = \frac{1}{N_{SAM}} \sum_{n=1}^{N_{SAM}} |y(n) - \hat{y}(n)|^2, \quad \text{Eq (23)}$$

where $N_{SAM}$ is the number of samples over which the error is accumulated to provide the MSE. Typically, the mean square error is averaged over a number of samples, and over one or more pilot references, to obtain a desired level of confidence in the measurement. The mean square error can then be translated to an equivalent signal-to-noise ratio, which can be expressed as:

$$S/N_{EQ} = \frac{1}{MSE} - 1 \quad \text{linear} \qquad \text{Eq (24)}$$
$$= 10 \log\left(\frac{1}{MSE} - 1\right) \quad \text{dB}$$

The $S/N_{EQ}$ for the signal processing path with equalizer 310 can be compared with the $S/N_{RAKE}$ for the signal processing path with rake receiver 330. The signal processing path that provides the better S/N can then be selected to process the received signals.

Alternatively, the MSE can be computed for the signal processing path with rake receiver 330 (using equation 23) and compared against the MSE computed for the signal processing path with equalizer 310. The signal processing path with the better MSE can then be selected.

For the HDR system, the S/N is estimated at a remote terminal and used to determine a maximum data rate that can be received by the remote terminal for the operating conditions. The maximum data rate is then transmitted back to the base station for which the S/N is estimated. Thereafter, that base station transmits to the remote terminal at a data rate up to identified maximum data rate.

With the present invention, the data rate for a data transmission can be estimated using various methods. In one method, the S/N can be estimated for the rake receiver or for the equalizer based on the computed MSE, as shown in equation (24). The best S/N from all signal processing paths can then be used to determine a maximum data rate that can be supported. Alternatively, the MSE can be used to directly determine the maximum data rate. The best S/N, MSE, or maximum data rate can be sent to the base station.

Under certain operating conditions, the signal processing path with the equalizer can provide better performance than the one with the rake receiver. For example, the signal processing path with the equalizer typically performs better when the S/N is high and for channels with ISI. The rake receiver can be used to process multipaths, which also cause ISI. In fact, the rake receiver can be viewed as a filter with L taps (where L corresponds to the number of finger processors), with each tap corresponding to a time delay that can be adjusted. However, the rake receiver is not as effective at reducing ISI due to frequency distortion in the received signals.

The equalizer can more effectively reduce ISI due to frequency distortion. This is achieved by providing a response that is approximately the inverse of the frequency distortion while attempting to minimize the overall noise, which includes the ISI. The equalizer thus "inverts" the channel and also attempts to smooth out the effect of multipath. In fact, each filter 410, when the coefficients are initialized to $\{0, \ldots, 0, 1, 0, \ldots, 0\}$, is equivalent to one finger processor. Subsequently, as the zero-valued coefficients are adapted, the filter frequency response is altered to equalize the channel distortion. Thus, the equalizer can be used to effectively deal with both multipath-induced ISI and channel-induced ISI.

For simplicity, many of the aspects and embodiments of the invention have been described for a spread spectrum communication system. However, many of the principles of the invention described herein can be applied to non-spread spectrum communication systems, and communication systems capable of selectively performing direct sequence spreading, such as the HDR system.

Filters 410 in FIGS. 4A and 4B can be designed to be of any length (i.e., any number of taps and coefficients). More taps allow filter 410 to better correct for frequency distortion in the received signal and to process multipaths having larger time offsets. However, more taps equate to increased complexity, more complicated computations to equalize the taps, and possibly longer convergence time. The number of taps is thus a design choice and is selected based on a number of factors including, for example, costs, performance, complexity, and so on. For example, it may be desirable to provide equalization over a particular time window (e.g., 20 μsec), in which case the number of taps may be dependent on the sample rate, $f_{SAMP}$. Any number of taps can be employed and are within the scope of the invention.

The processing units described herein (e.g., filters 410, equalizer 310, post processor 320, rake receiver 330, and so on) can be implemented in various manners such as, for example, within one or more application specific integrated circuits (ASICs), digital signal processors (DSPs), microcontrollers, microprocessors, or other electronic circuits designed to perform the functions described herein. Also, the processing units can be implemented with a general-purpose or specially designed processor operated to execute instruction codes that implement the functions described herein. Thus, the processing units described herein can be implemented using hardware, software, or a combination thereof.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for processing one or more signals in a spread spectrum communication system, the method comprising:
   receiving and processing the one or more signals to provide one or more streams of samples;
   first processing the one or more streams of samples to provide a first stream of recovered symbols, wherein first processing comprises:
      equalizing the one or more streams of samples with an equalizer to generate symbol estimates, wherein equalizing comprises quantizing the symbol estimates, and
      processing the symbol estimates to provide the first stream of recovered symbols, comprising:
         despreading the symbol estimates with a PN sequence to generate despread symbols, and
         decovering the despread symbols to generate the first stream of recovered symbols;
      wherein despreading and decovering are selectively performed, depending on a data rate of the one or more received signals;
   second processing a multipath of the one or more streams of samples with one or more rake receivers to provide a second stream of recovered symbols;
   estimating a signal quality associated with each of the first and second processing; and
   selecting the first or second processing based on estimated signal qualities associated therewith.

2. The method of claim 1, wherein the signal quality associated with the first processing is estimated based on a mean square error (MSE) between the symbol estimates and expected symbols.

3. The method of claim 2, wherein a data rate of the one or more signals is selected based, in part, on the mean square error.

4. The method of claim 1, wherein for the first processing, the step of processing the symbol estimates comprises combining the symbol estimates, and wherein equalizing the one or more streams of samples is performed prior to combining.

5. The method of claim 4, further comprising:
first adapting coefficients of each of one or more filters within the equalizer, wherein one filter is operative to filter each of the one or more streams of samples; and
second adapting one or more scaling factors used for the combining.

6. The method of claim 5, wherein the first and second adapting are performed separately and sequentially, wherein the first adapting is performed with the one or more scaling factors fixed, and wherein the second adapting is performed with the coefficients for the one or more filters fixed.

7. The method of claim 5, wherein the first and second adapting are performed iteratively a number of times.

8. The method of claim 5, wherein the first and second adapting are performed iteratively over a particular sequence of expected symbols.

9. The method of claim 5, wherein the first and second adapting are performed based on the symbol estimates.

10. The method of claim 1, further comprising:
first adapting coefficients of each of one or more filters within the equalizer, wherein one filter is operative to filter each of the one or more streams of samples.

11. The method of claim 10, wherein the first adapting is performed for each filter based on filtered samples from the filter.

12. The method of claim 10, wherein the first adapting is performed for the one or more filters based on the symbol estimates.

13. The method of claim 10, wherein the coefficients of each filter are initialized to particular set of values.

14. The method of claim 10, further comprising:
identifying a large multipath of one of the one or more signals being received and processed, and
wherein the first adapting is performed based on a time offset corresponding to the identified large multipath.

15. The method of claim 10, wherein the first adapting attempts to minimize a mean square error between the symbol estimates and expected symbols.

16. The method of claim 10, wherein the first adapting attempts to minimize a mean square error between the filtered samples from the filter and expected symbols.

17. The method of claim 10, further comprising:
slicing the symbol estimates to generate sliced symbol estimates, and
wherein the first adapting is performed using the sliced symbol estimates.

18. The method of claim 10, wherein each filter within the equalizer is implemented as a finite impulse response (FIR) filter.

19. The method of claim 10, wherein the first adapting is performed using time division multiplexed (TDM) pilot reference.

20. The method of claim 10, wherein the first adapting is performed using code division multiplexed (CDM) pilot reference.

21. The method of claim 10, wherein the first adapting is performed using a least mean square (LMS) algorithm.

22. The method of claim 10, wherein the first adapting is performed using a recursive least square (RLS) algorithm.

23. The method of claim 10, wherein the first adapting is performed using a direct matrix inversion (DMI) algorithm.

24. The method of claim 10, wherein first processing further comprises combining the one or more streams of samples based on one or more scaling factors, one scaling factor for each of the one or more streams of samples.

25. The method of claim 24, further comprising:
second adapting the one or more scaling factors prior to the combining.

26. The method of claim 25, further comprising:
identifying a large multipath for each of the one or more signals being received and processed, and
initializing each scaling factor based on a respective identified large multipath.

27. The method of claim 25, wherein the second adapting is performed based on the symbol estimates.

28. The method of claim 1, wherein first processing further comprises combining the one or more streams of samples prior to equalizing the one or more streams of samples.

29. A method for processing one or more signals in a communication system, the method comprising:
receiving and processing the one or more signals to provide one or more streams of samples;
first processing the one or more streams of samples to provide a first stream of recovered symbols, wherein the first processing comprises:
equalizing the one or more streams of samples with an equalizer to generate symbol estimates, wherein equalizing comprises quantizing the symbol estimates, and
processing the symbol estimates to provide the first stream of recovered symbols;
second processing a multipath of the one or more streams of samples with one or more rake receivers to provide a second stream of recovered symbols;
estimating a signal quality associated with each of the first and second processing;
selecting the first or second processing based on estimated signal qualities associated therewith; and
adapting coefficients of each of one or more filters within the equalizer;
wherein the coefficients of each filter within the equalizer are adapted using a time division multiplexed (TDM) pilot reference or a code division multiplexed (CDM) pilot reference.

30. A method for processing one or more signals in a communication system, the method comprising:
receiving and processing the one or more signals to provide one or more streams of samples;
first processing the one or more streams of samples to provide a first stream of recovered symbols, wherein the first processing includes
equalizing the one or more streams of samples with an equalizer to generate symbol estimates, wherein equalizing comprises quantizing the symbol estimates, and
processing the symbol estimates to provide the first stream of recovered symbols;
second processing a multipath of the one or more streams of samples with one or more rake receivers to provide a second stream of recovered symbols;

estimating a signal quality associated with each of the first and second processing;

selecting the first or second processing based on estimated signal qualities associated therewith; and adapting coefficients of each of one or more filters within the equalizer;

wherein the coefficients of each filter within the equalizer are adapted using a least mean square (LMS) algorithm, a recursive least square (RLS) algorithm, a direct matrix inversion (DMI) algorithm, or a combination thereof.

31. A receiver unit operative to process one or more signals in a communication system, the receiver unit comprising:

one or more pre-processors operative to receive and process the one or more signals to provide one or more streams of samples;

an equalizer coupled to the one or more pre-processors and operative to receive, combine, and equalize the one or more streams of samples to generate symbol estimates; and a post processor coupled to the equalizer and operative to receive and process the symbol estimates;

wherein the equalizer comprises:

one or more multipliers respectively coupled to the one or more pre-processors, each of the multipliers operative to receive and multiply a respective stream of samples with a respective scaling factor to provide scaled samples;

a summer coupled to the one or more multipliers and operative to receive and sum the scaled samples from the one or more multipliers to provide summed samples;

a slicer coupled to the summer to receive and quantize the symbol estimates to generate sliced symbol estimates;

a filter coupled to the summer and operative to receive and filter the summed samples with a set of coefficients to provide the symbol estimates;

a coefficient adjustment element coupled to the filter and operative to adapt the set of coefficients for the filter based on the symbol estimates; and a slicer coupled to the filter and operative to receive and slice the symbol estimates to generate sliced symbol estimates;

wherein the coefficient adjustment element is operative to adapt the set of coefficients for the filter based on the sliced symbol estimates.

* * * * *